(12) United States Patent
Ishikawa et al.

(10) Patent No.: US 7,116,534 B2
(45) Date of Patent: Oct. 3, 2006

(54) MAGNETORESISTIVE HEAD

(75) Inventors: Chiaki Ishikawa, Kokubunji (JP); Hiroyuki Hoshiya, Odawara (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 665 days.

(21) Appl. No.: 10/611,557

(22) Filed: Jul. 2, 2003

(65) Prior Publication Data
US 2004/0114285 A1   Jun. 17, 2004

(30) Foreign Application Priority Data
Dec. 13, 2002   (JP)   ............... 2002-361607

(51) Int. Cl.
*G11B 5/39* (2006.01)
(52) U.S. Cl. ................................ 360/324.12
(58) Field of Classification Search ............ 360/324.1, 360/324.11, 324.12
See application file for complete search history.

(56) References Cited

U.S. PATENT DOCUMENTS

| | | | |
|---|---|---|---|
| 4,663,685 A | 5/1987 | Tsang | |
| 5,668,688 A | 9/1997 | Dykes et al. | |
| 6,583,970 B1 * | 6/2003 | Sakata | 360/324.12 |
| 6,594,124 B1 * | 7/2003 | Zheng et al. | 360/324.12 |
| 6,704,176 B1 * | 3/2004 | Shukh et al. | 360/324.12 |
| 6,754,056 B1 * | 6/2004 | Ho et al. | 360/324.2 |
| 6,779,248 B1 * | 8/2004 | Dovek et al. | 29/603.08 |
| 6,807,033 B1 * | 10/2004 | Zhu | 360/324 |
| 6,856,494 B1 * | 2/2005 | Ooshima et al. | 360/324.12 |
| 6,879,475 B1 * | 4/2005 | Kishi et al. | 360/324.2 |
| 7,054,117 B1 * | 5/2006 | Ho et al. | 360/324.12 |
| 7,057,863 B1 * | 6/2006 | Cyrille et al. | 360/324.12 |

FOREIGN PATENT DOCUMENTS

| | | |
|---|---|---|
| JP | 3-125311 | 9/1990 |
| JP | 8-147631 | 11/1994 |
| JP | 2000-228004 | 5/1999 |

OTHER PUBLICATIONS

B. Dieny, V.S. Speriosu, S.S.P. Parkin, B.A. Gurney, D.R. Wilhoit and D. Mauri, "Giant Magnetoresistance in Soft Ferromagnetic Multilayers", The American Physical Society (Jan. 1, 1991), Physical Review B, vol. 43, No. 1, pp. 1297-1300.

(Continued)

*Primary Examiner*—Angel Castro
(74) *Attorney, Agent, or Firm*—Reed Smith LLP; Stanley P. Fisher, Esq.; Juan Carlos A. Marquez, Esq.

(57) ABSTRACT

In a giant magnetoresistive head, a magnetic read width is reduced and a read output is increased. The giant magnetoresistive head has a magnetoresistive film having a pinned layer, a non-magnetic layer, and a free layer, a pair of terminals for applying a current to the magnetoresistive film, and bias applying means for applying a bias magnetic field for magnetic domain control to the free layer. The free layer has a sensing region and a pair of out-of-sensing-region regions on both ends of the sensing region. The magnetization direction of one of the out-of-sensing-region regions and the magnetization direction of the other out-of-sensing-region region have different components in a direction of element height of head. The magnetization of the one out-of-sensing-region region and the magnetization of the other out-of-sensing-region region are nearly symmetrical relative to the sensing region interposed therebetween.

10 Claims, 19 Drawing Sheets

OTHER PUBLICATIONS

M. Takagishi, K. Koi, M. Yoshikawa, T. Funayama, H. Iwasaki and M. Sahashi, "The Applicability of CPP-GMR Heads for Magnetic Recording", IEEE Transactions on Magnetics, vol. 38, No. 5, Sep. 2002, pp. 2277-2282.

* cited by examiner

EXCHANGE COUPLED REGION | SENSING REGION | EXCHANGE COUPLED REGION

EXCHANGE COUPLED REGION | SENSING REGION | EXCHANGE COUPLED REGION

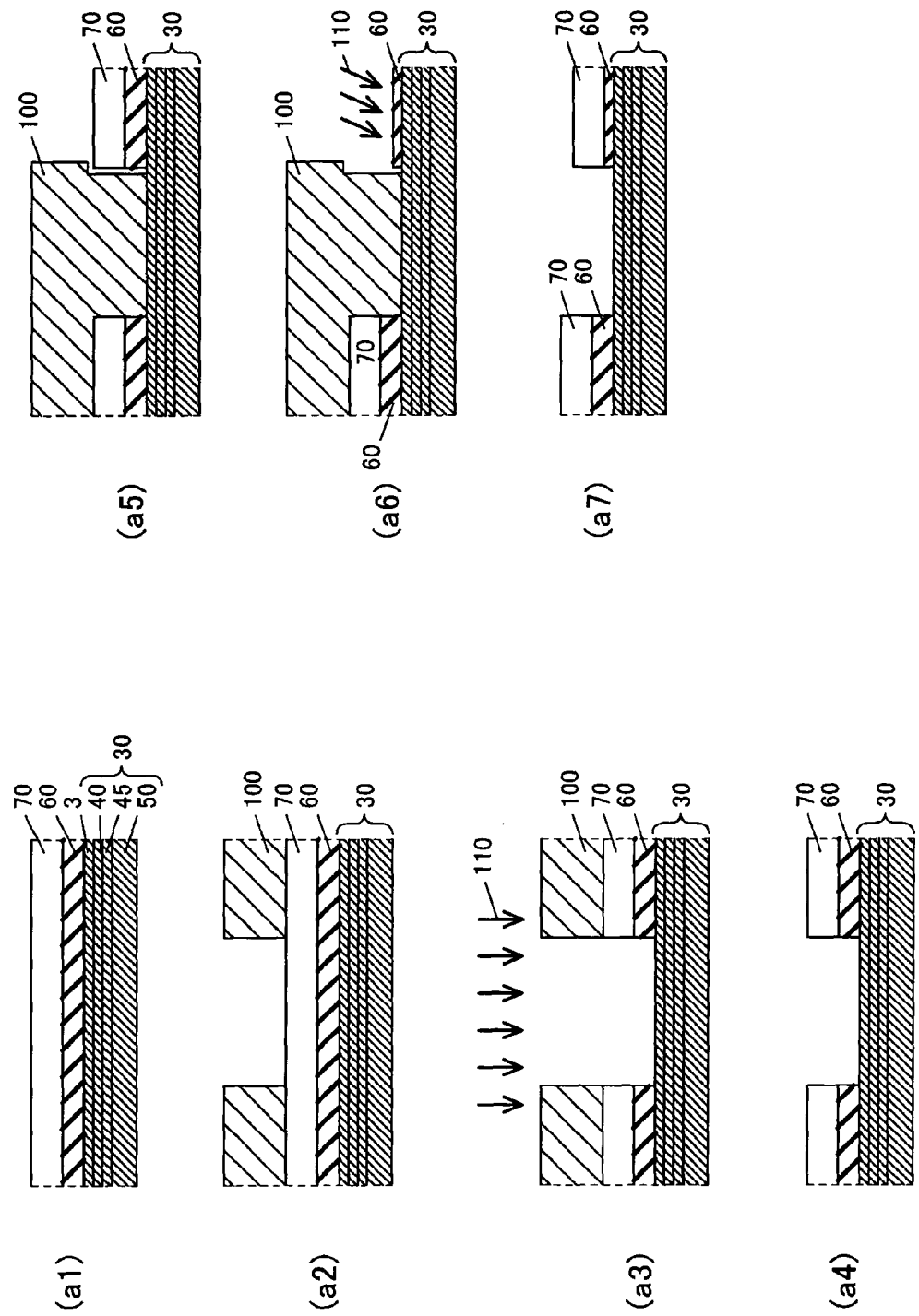

(b1)

(b2)

(b3)

(b4)

(b5)

(b6)

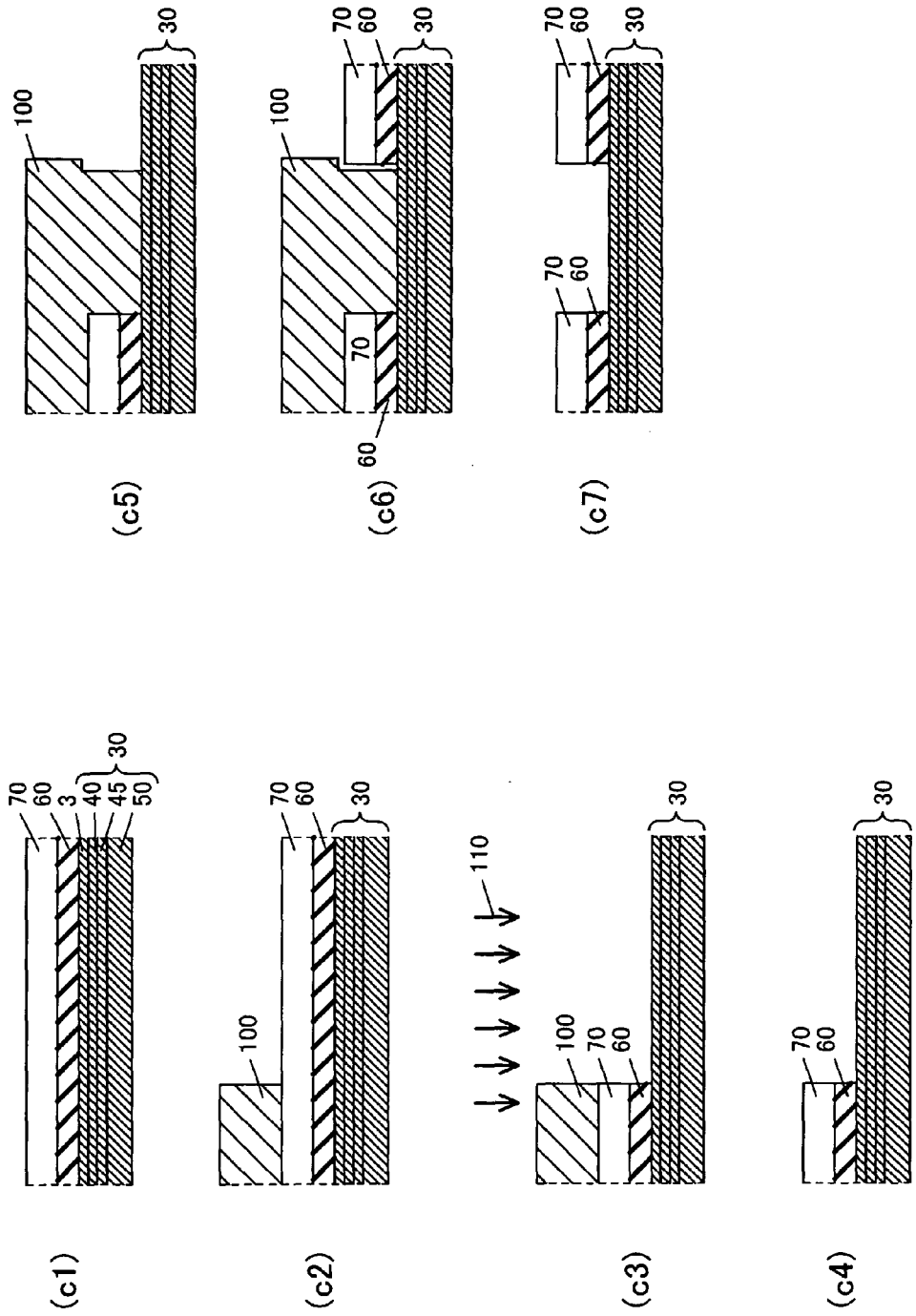

CROSS-SECTION VIEW

PLANE VIEW

MAGNETORESISTIVE HEAD

BACKGROUND OF THE INVENTION

1. Field of the Invention

The present invention relates to a magnetoresistive element composed of a pinned layer, a non-magnetic layer, and a free layer deposited in stacked relation, to a magnetoresistive head comprising the magnetoresistive element, and to respective methods for fabricating the magnetoresistive element and the magnetoresistive head.

2. Description of the Related Art

As magnetic disk apparatus have been increased in density, a high sensitivity read head has been on growing demand. As an example of the high sensitivity read head, a structure as disclosed in Non-Patent Document 1 has been known, in which two ferromagnetic layers are separated from each other by a non-magnetic metal layer and an exchange bias magnetic field is applied from an antiferromagnetic layer to one of the ferromagnetic layers to fix the magnetization thereof.

It is shown in the foregoing paper that, in such a multilayer film, a resistance R has a component which varies in proportion to cos θ as a function of an angle θ between the respective magnetizations of the two ferromagnetic layers. Such an effect is termed a giant magnetoresistive effect (GMR) or a spin valve effect and such a multilayer film is termed a magnetoresistive film.

There are cases where a sense current is caused to flow in parallel to a film surface (Current in plane, hereinafter referred to as CIP) and where the current is caused to flow perpendicularly to the film surface (Current perpendicular to the plane, hereinafter referred to as CPP) in the giant magnetoresistive head. It has been known that an MR ratio in the CPP mode is twice or more as high as the MR ratio in the CIP mode. Reports on the giant magnetoresistive head in the CPP mode are disclosed in, e.g., Patent Document 1 and Patent Document 2.

To obtain an excellent read voltage in these read heads, it is necessary to change the ferromagnetic layer composing the magnetoresistive film into a single domain. For this purpose, there is a magnetic domain control method termed a hard bias structure, which is disclosed in, e.g., Patent Document 3. The method suppresses Barkhausen noise resulting from a magnetic domain structure by disposing permanent magnetic films at both ends of the magnetoresistive film, applying a longitudinal bias field for magnetic domain control in a direction of track width to the magnetoresistive film, and thereby changing the ferromagnetic layer into a single domain.

As another method for changing the ferromagnetic layer into a single domain, a method for magnetic domain control termed patterned exchange is disclosed. in, e.g., Patent Document 4. The method disposes antiferromagnetic layers in left and right end regions in spaced apart relation such that they are in direct contact with the top portions of the ferromagnetic layer, thereby fixing the respective magnetizations of the both end regions of the ferromagnetic layer by exchange coupling to the antiferromagnetic layer and changing the ferromagnetic layer into a single domain. It is normally assumed that the magnetizations of the both end regions of the ferromagnetic layer are oriented in the direction of track width.

Patent Document 5 discloses a head having read sensitivity improved by tilting the magnetizations of the both end regions of the ferromagnetic layer from the direction of track width. In the head, the respective magnetizations of the left and right end portions are tilted in the same direction for improved read sensitivity.

FIG. 16 shows a conventional CIP mode giant magnetoresistive head to which magnetic domain control has been performed by patterned exchange. The head comprises a magnetoresistive film (GMR film) 30 composed of a free layer 35, a non-magnetic metal layer (Cu layer) 40, a pinned layer 45, and an antiferromagnetic layer 50 which have been stacked. The magnetization of the pinned layer 45 is fixed to the direction of element height of head. In general, an axis of easy magnetization for the free layer 35 is oriented to be parallel with the direction of track width of head.

To fabricate the CIP mode giant magnetoresistive head, a magnetic shield layer 10, a magnetic gap layer 20, and the magnetoresistive film (GMR film) 30 are deposited first on a substrate 5 in stacked relation. After an antiferromagnetic film 60 and an electrode film 70 are deposited on the magnetoresistive film 30, they are patterned. Then, a magnetic shield film 90 is formed on the electrode film 70 with a magnetic gap layer 80 interposed therebetween.

[Patent Document 1]

U.S. Pat. No. 5,668,688

[Patent Document 2]

Japanese Laid-Open Patent Publication No. 2000-228004

[Patent Document 3]

Japanese Laid-Open Patent Publication No. HEI 3-125311

[Patent Document 4]

U.S. Pat. No. 4,663,685

[Patent Document 5]

Japanese Laid-Open Patent Publication No. HEI 8-147631

[Non-Patent Document 1]

"Giant Magnetoresistive Effect in Soft Magnetic Multilayer Film" (Physical Review B, Vol. 43, pp,1297–1300)

BRIEF SUMMARY OF THE INVENTION

In the field of magnetic recording, a further reduction in the track width of a magnetic head and a further improvement in read sensitivity are required as a recording density increases. If the track width of the magnetic head is reduced, however, permanent magnetic films for magnetic domain control or antiferromagnetic layers (bias applying films) disposed on both ends of the magnetoresistive element are greatly affected thereby. This reduces the magnetization rotation of the free layer in response to a signal magnetic field and thereby causes a problem of lowered read sensitivity. To present the problem, a minimized longitudinal bias field is applied preferably to the center portion of the track of the free layer so that excellent sensitivity is maintained.

The read head also has a side-reading problem that a magnetic read width becomes larger than a physical read width defined as an inter-electrode width. If the track width of the magnetic head is reduced, a proportion of an amount of side reading to the track width is increased to exert greater influence. Therefore, it is an important task to reduce the amount of side reading in the direction of track width.

It is therefore an object of the present invention to provide a magnetoresistive element with high read sensitivity and with reduced side reading even if the track width thereof has been reduced, a magnetoresistive head comprising the magnetoresistive element, and a method for fabricating the magnetoresistive head. Another object of the present invention is to provide a magnetic memory device which comprises the foregoing magnetoresistive head and can be combined with a magnetic recording medium with a high recording density.

To attain the foregoing objects, each of a magnetoresistive element and a magnetic head according to the present invention is mainly characterized in that it comprises: a magnetoresistive film having a pinned layer, a non-magnetic layer, and a free layer; a pair of terminals for applying a current to the magnetoresistive film; and bias applying means for applying a bias magnetic field for magnetic domain control to the free layer, the free layer having a sensing region and a pair of out-of-sensing-region regions on both ends of the sensing region, a magnetization direction of one of the out-of-sensing-region regions and a magnetization direction of the other out-of-sensing-region region having different components in a direction of element height, magnetization of the one of the out-of-sensing-region regions and magnetization of the other out-of-sensing-region region being nearly symmetrical relative to the sensing region interposed therebetween.

More specifically, each of the magnetoresistive element and magnetic head according to the present invention is mainly characterized in that it comprises: a magnetoresistive film having a pinned layer, a non-magnetic layer, and a free layer; a pair of terminals for applying a current to the magnetoresistive film; and bias applying means for applying a bias magnetic field for magnetic domain control to the free layer, the magnetoresistive element or magnetic head further comprising, if a direction of track width is designated by an x-axis, a direction of element height orthogonal to the direction of track width is designated by a y-axis, a magnetization direction of the free layer is designated as an x-plus direction, and a direction opposite to an air bearing surface is designated as a y-plus direction: means for generating a bias magnetic field having a component in the y-plus direction in a region of the free layer located on an x-minus side and generating a bias magnetic field having a component in a y-minus direction in a region of the free layer located on the x-plus side.

FIG. 1A shows the result of calculating, by simulation, a magnetization distribution in a free layer in a conventional patterned exchange structure. A bias magnetic field in the direction of track width has been applied to each of the left and right edges of the track width which are exchange coupled to antiferromagnetic layers so that the magnetization is oriented in the direction of track width. Since an exchanged coupled magnetic field normally ranges from 500 Oe to 1000 Oe, the magnetization of the free layer in each of the exchange coupled regions rotates upon the application of a media field to the track edges during an off-track period. Since the magnetization rotation at the track edges is propagated by exchange in the free layer to a sensing region corresponding to the track width, side reading is increased disadvantageously.

By contrast, the magnetization of a free layer is distributed as shown in FIG. 1B in the head according to the present invention which uses a bias magnetic field changed in direction. In such a head, a magnetic field from a medium that has been applied to the track edges during an off-track period is easily propagated in a direction orthogonal to the magnetization, i.e., in an outward direction from a sensing region so that the magnetization rotation is less likely to be propagated to the sensing region. Consequently, side reading can be reduced and a magnetic read width can be reduced.

In addition, the magnetization of the free layer in each of the exchange coupled regions is tilted to the direction of element height of head so that the bias magnetic field applied to the sensing region is reduced. This offers the advantage of an improved read output from the head. Although the bias magnetic field applied to the sensing region is necessary to change the free layer into a single domain, the magnetization rotation of the free layer in response to the media field is reduced if the applied bias magnetic field is excessively intense so that the read output is reduced.

The magnetoresistive element and magnetic head according to the present invention are so constituted as to allow a current to flow in the direction of the thickness of the magnetoresistive film by depositing a pair of terminals for applying the current on the magnetoresistive film either indirectly with a metal film interposed therebetween or directly without a metal film interposed therebetween. The magnetic head according to the present invention is mainly characterized by a magnetoresistive element mounted thereon which includes means for generating a bias magnetic field with the current such that the bias magnetic field has a component in the y-plus direction in the x-minus region of the free layer and that the bias magnetic field has a component in the y-minus direction in the x-plus region of the free layer.

In particular, the length of a region for sensing a signal is adjusted to be equal to the length of a pinned layer by adjusting the length in the direction of track width of the pinned layer to be smaller than the length in the direction of track width of the free layer. By further adjusting the lengths in the direction of track width of the pair of terminals for applying a current to be larger than the length in the direction of track width of the pinned layer, the bias magnetic field can be applied efficiently to the track edges.

BRIEF DESCRIPTION OF THE DRAWINGS

FIGS. 7A to 7C are views showing the fabrication process for the giant magnetoresistive element according to the present invention;

DETAILED DESCRIPTION OF THE PREFERRED EMBODIMENTS

Figure 1A:
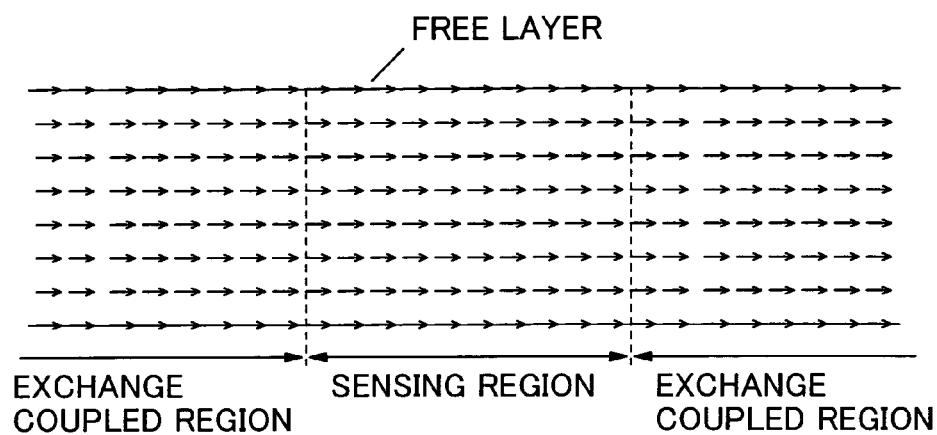
FIGS. 1A and 1B are views each showing the result of simulating the respective magnetized states of the free layers in a conventional magnetoresistive element and a magnetoresistive element to which the present invention is applied.

A detailed description will be given herein below to preferred magnetoresistive heads to which the present invention is applied.

Embodiment 1

If a magnetoresistive head to which the present invention is applied is, e.g., a CIP mode magnetic head, a lower shield film (NiFe film), an insulating film ($Al_2O_3$ film) for magnetic gap formation, and a magnetoresistive element are deposited in this order on a substrate. An electrode composed of Nb/Au/Nb is further deposited on the magnetoresistive element to supply a current to the magnetoresistive film. An insulating film ($Al_2O_3$ film) for magnetic gap formation and an upper shield film (NiFe film) are deposited in this order over the magnetoresistive element and the electrode.

In the magnetoresistive element, a first antiferromagnetic layer, a second ferromagnetic layer (hereinafter referred to as a pinned layer), a non-magnetic layer, and a first ferromagnetic layer (hereinafter referred to as a free layer) are deposited in this order. A second antiferromagnetic layer (MnPt film) exchange coupled to the free layer is further disposed on each of the edges of the free layer to compose a bias applying film.

The pinned layer is defined herein as a magnetic layer of which the magnetization is fixed in a given direction by the first antiferromagnetic layer. The free layer is defined as a magnetic layer capable of freely changing the magnetization direction thereof on receipt of a signal magnetic field from a recording medium. A direction of track width is defined as a direction perpendicular to the direction in which a magnetic head moves relative to a recording medium in a direction parallel to a surface of the medium.

A preferred embodiment of the magnetoresistive element to which the present invention is applied is characterized by the following structure.

Specifically, the free layer is characterized in that it has a sensing region and a pair of out-of-sensing-region regions on both edges of the sensing region, the magnetization direction of one of the out-of-sensing-region regions and that of the other out-of-sensing-region region have different components in a direction of element height of head, and the magnetization of the one out-of-sensing-region region and that of the other out-of-sensing-region region are nearly symmetrical relative to the sensing region interposed therebetween.

The out-of-sensing-region regions are defined herein as regions under magnetic domain control with a bias magnetic field applied thereto by the bias applying films.

Specifically, if the direction of track width is designated as an x-axis, the direction of element height of head orthogonal to the direction of track width is designated as a y-axis, the magnetization direction of the free layer is designated as an x-plus direction, and a direction opposite to an air bearing surface is designated as a y-plus direction, the bias applying film on the x-minus side generates a bias magnetic field having a component in the y-plus direction, while the bias applying film on the x-plus side generates a bias magnetic field having a component in the y-minus direction.

If the magnetization direction of the free layer determined by the bias magnetic field is designated as ($\sin \theta$, $\cos \theta$) and the plus direction of the x-axis is designated as (0, 1), the magnetization direction of the free layer exchange coupled to the bias applying film on the x-minus side is preferably $0<\theta<90$ and the magnetization direction of the free layer exchange coupled to the bias applying film on the x-plus side is preferably $270<\theta<360$.

In a typical patterned exchange structure, if the magnetization of a free layer in each of exchange coupled regions is rotated by a magnetic field from a medium, the action of the magnetization is propagated by exchange to a sensing region corresponding to the track width so that side reading is increased. To prevent this, the present invention is constituted such that the bias applying film on the x-minus side generates a bias magnetic field having the component in the y-plus direction and the bias applying film on the x-plus side generates a bias magnetic field having the component in the y-minus direction. The arrangement renders the magnetic field from the medium applied to the exchange coupled region less likely to be propagated to the sensing region and thereby reduces side reading.

If the magnetization direction of the free layer exchange coupled to the bias applying film on the x-minus side becomes $90 \leq \theta \leq 270$ over the entire region, a bias magnetic field for changing the free layer into a single domain is not applied sufficiently so that Barkhausen noise occurs. If the magnetization direction of the free layer exchange coupled to the bias applying film on the x-minus side becomes $270<\theta \leq 360$, the effect of reducing side reading cannot be obtained. Likewise, if the magnetization direction of the free layer in the exchange coupled region on the x-plus side becomes $0 \leq \theta<90$, the effect of reducing side reading cannot be obtained and if the magnetization direction of the free layer in the exchange coupled region on the x-plus side becomes $90 \leq \theta \leq 270$, a bias magnetic field for changing the free layer into a single domain is not applied sufficiently. From the foregoing, it can be concluded that the magnetization direction ($\sin \theta$, $\cos \theta$) of the free layer exchange coupled to the bias applying films is preferably $0<\theta<90$ on the x-minus side and $270<\theta<360$ on the x-plus side.

Figure 2A:
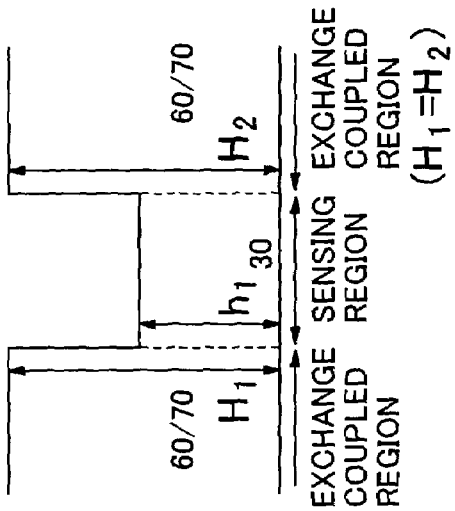
FIGS. 2A to 2D are schematic diagrams each showing a plan configuration of the magnetoresistive element to which the present invention is applied.

The height H of each of the exchanged coupled regions of the free layer in the magnetoresistive element according to the present embodiment may also be equal to the height h of the sensing region, as shown in, e.g., FIG. 2A.

The heights H and h are defined herein as a maximum value of the height of the exchange coupled region and as a maximum value of the height of the sensing region, respectively.

Figure 2B:
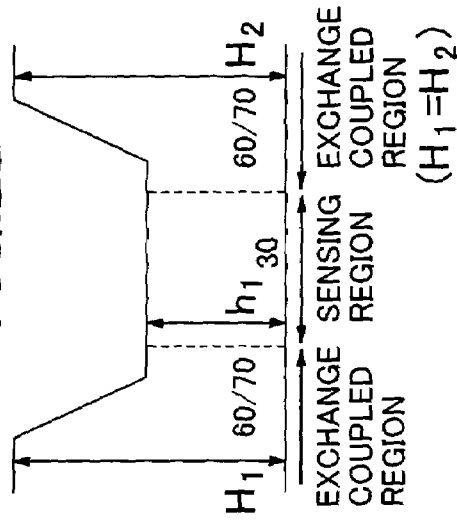

If the respective maximum values of the heights of the left and right exchange-coupled regions are designated as $H_1$ and $H_2$, as shown in FIG. 2B, the magnetization of the free layer in each of the exchange coupled regions is more likely to be oriented in the direction of element height of head by adjusting the heights $H_1$ and $H_2$ to be larger than the height h of the sensing region so that side reading is reduced and the effect of increasing a read output is enhanced.

Figure 2C:
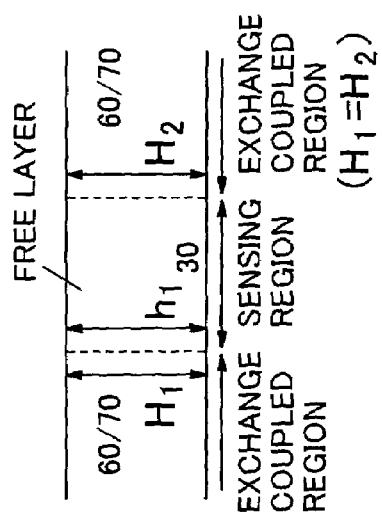

As shown in FIG. 2C, the height $H_1$ of one of the exchange coupled regions may be larger than the height h of the sensing region.

Figure 2D:
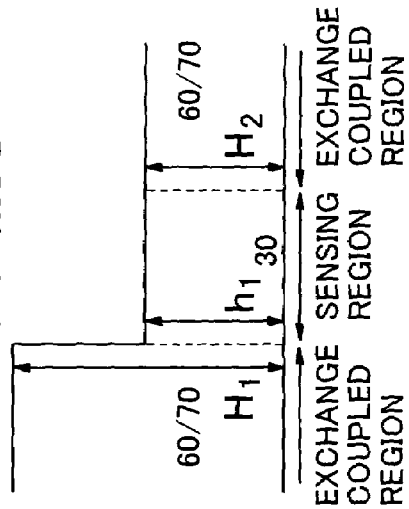

As shown in FIG. 2D, each of the exchanged coupled regions may also have an inclined portion having a height smaller than the height $H_1$ or $H_2$.

Although the description has been given to the case where $H_1=H_2$ is satisfied with reference to FIGS. 2A to 2D, the heights $H_1$ and $H_2$ may also have different values.

The bias applying films to be exchange coupled at the edges of the free layer may also be permanent magnetic layers. In the magnetoresistive element according to the present embodiment thus constituted, magnetization rotation occurred outside the sensing region is less likely to be propagated, while magnetization rotation caused by a medium magnetic field inside the sensing region can be enhanced.

Consequently, a magnetic head comprising the magnetoresistive element can reduce side reading and achieve a high read output. The magnetic head to which the present invention is applied can also reduce side reading and achieve a high read output even when the track thereof is narrowed so that a track width defined as, e.g., an inter-electrode spacing is 0.05 to 0.1 ìm.

Figure 3:
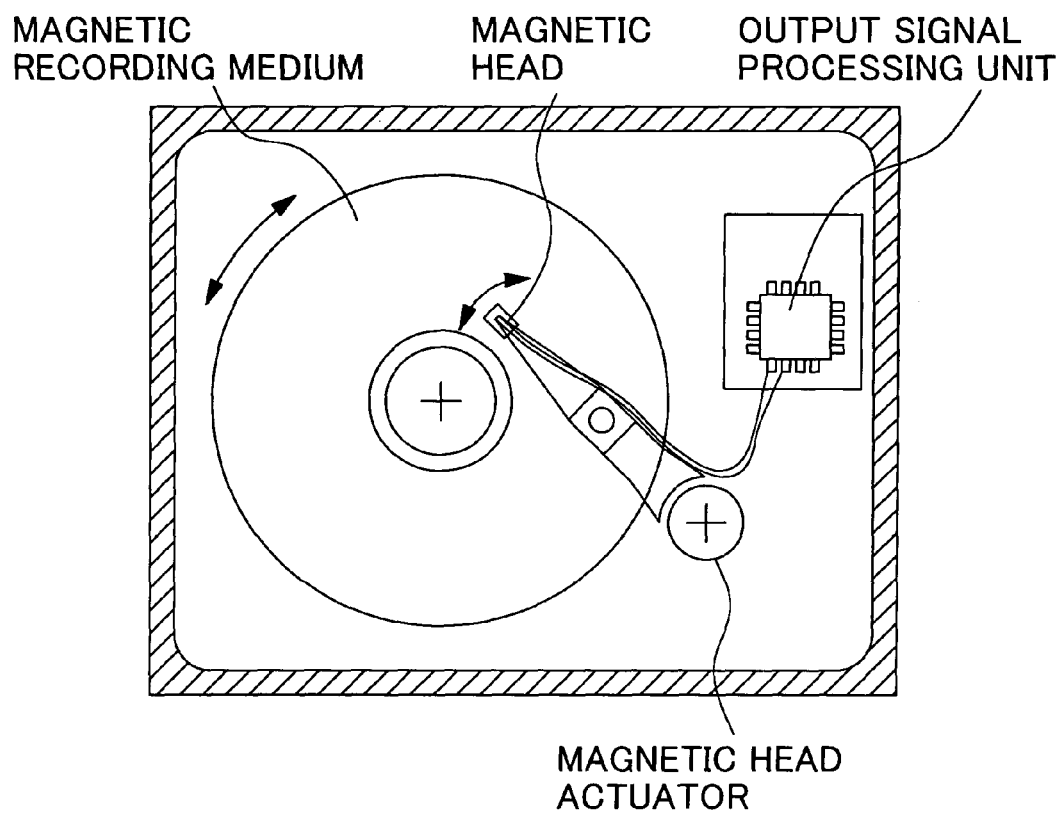
FIG. 3 is a schematic diagram showing a magnetoresistive memory device to which the present invention is applied.

As shown in, e.g., FIG. 3, a magnetoresistive memory device comprising the foregoing magnetoresistive head comprises a magnetic recording medium, a magnetic recording medium actuator, a magnetic head actuator for actuating a magnetic head comprising the magnetoresistive head, and a read signal processing system for processing a signal on the magnetic recording medium that has been read by the magnetic head.

Figure 4:
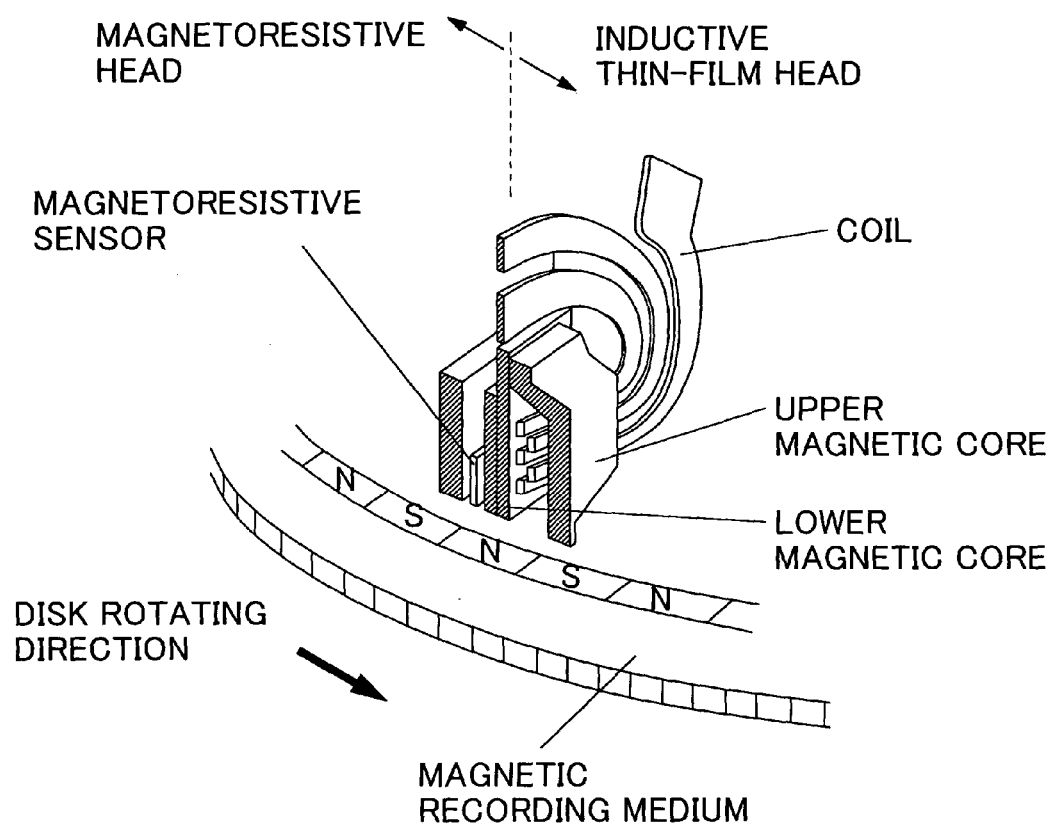
FIG. 4 is a schematic diagram of a magnetic head to which the present invention is applied.

The magnetoresistive head may also be formed integrally with an inductive thin-film magnetic head. As shown in, e.g., FIG. 4, the inductive thin-film magnetic head comprises a lower magnetic core, an upper magnetic core disposed in opposing relation to the lower magnetic core, and a coil disposed between the upper and lower magnetic cores.

Since the magnetic memory device thus constituted comprises the magnetic head having the magnetoresistive element described above, it undergoes reduced side reading and achieves a high read output even in combination with a magnetic recording medium which is extremely low in recording density, i.e., small in track width. With a CIP-GMR head, e.g., a combination with a magnetic recording medium having a recording density of about 100 Gb/in2 is possible. With a CPP-GMR head, a combination with a magnetic recording medium having a recording density of 150 Gb/in2 or more is possible.

As a magnetic head to which the present invention is applied, a magnetic head comprising a CIP mode magnetoresistive element obtained by forming a lower shield film (NiFe film) 10 and an insulating film ($Al_2O_3$ film) 20 for magnetic gap formation on a substrate 5 and then forming a giant magnetoresistive film (GMR film) 30 was fabricated.

The magnetoresistive element was formed as follows in accordance with the process shown in FIGS. 6A and 7A.

First, in Step a1, the GMR film 30 composed of an antiferromagnetic layer (MnPt) 50, a pinned layer (Co/Ru/Co multilayer film) 45, a non-magnetic layer (Cu) 40, and a free layer (NiFe/CoFe multilayer film) 35, an antiferromagnetic layer (MnPt) 60, and an electrode film (Nb/Au/Nb) 70 were deposited successively. The film thickness of the antiferromagnetic layer 60 was adjusted to 15 nm.

Next, in Step a2, an organic resist film 100 was deposited. Then, in Step a3, the electrode film 70 and the antiferromagnetic layer 60 were patterned by ion milling such that a track width (hereinafter referred to as Twr) defined as an inter-electrode spacing was adjusted to 0.1 ìm.

It is to be noted that the antiferromagnetic film underlying electrode films on both sides of the track width Twr serve as bias applying films for magnetic domain control.

Next, in Step a4, the organic resist film 100 was removed.

In Step a5, an organic resist film 100 was deposited over the inter-electrode region and one of the bias applying films.

In Step a6, the electrode films 70 and the antiferromagnetic films 60 are patterned by ion milling such that the thickness of one of the antiferromagnetic films 60 is smaller than that of the other antiferromagnetic film 60. One of the antiferromagnetic films was patterned by 3 nm to have a thickness of 12 nm.

In Step a7, electrode films 70 were deposited again on the upper portions of the patterned antiferromagnetic films and then the organic resist film 100 was removed. Thereafter, an insulating film ($Al_2O_3$ film) 80 for magnetic gap formation and an upper shield film (NiFe film) 90 were deposited, whereby the magnetic head was fabricated. The height of the free layer in each of the exchange coupled regions was adjusted to be equal to the height (hMR) of the free layer in the sensing region, while the height (hMR) was set to 0.1 ìm. The height indicates the size of a film in a direction perpendicular to the direction of track width, i.e., in the y-axis direction in the plane of the magnetoresistive element.

Figure 8A:
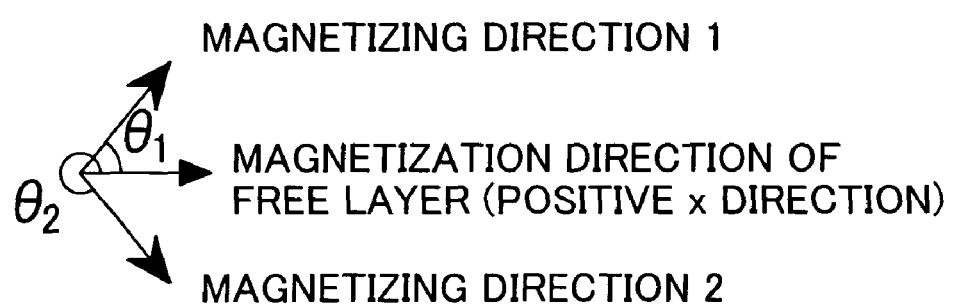
FIGS. 8A and 8B are views showing the magnetizing direction of the giant magnetoresistive element according to the present invention.

Since the respective thicknesses of the left and right antiferromagnetic films as the bias applying films are controlled to be different in the head according to the present embodiment, the left and right bias applying films are allowed to have different magnetizing directions by performing two heat treatments under different conditions. By assuming that the magnetization direction of the free layer is in the x-plus direction as shown in the plan view of FIG. 8A, a heat treatment was performed at 270 C for 30 minutes, while applying a magnetic field of 1 kOe in the magnetizing direction 1 tilted by $\theta_1$ from the x-plus direction, thereby magnetizing the bias applying film on the x-minus side composed of the antiferromagnetic film with a thickness of 15 nm. Then, a heat treatment was performed at 270 C for 9 hours, while applying a magnetic field of 1 kOe in the magnetizing direction 2 tilted by $\theta_2$ from the x-plus direction, thereby magnetizing the bias applying film on the x-plus side composed of the antiferromagnetic film with a thickness of 12 nm. In the present embodiment, $\theta_1$ was set to 80 and $\theta_2$ was set to 280. By the foregoing two heat treatments, the respective magnetization directions of the left and right exchange-coupled bias applying films were oriented in the directions shown in the schematic diagram of FIG. 8B.

Such magnetization directions can be observed by using a magnetic force microscopy (MFM) from above the floating surface of the head.

Figure 5:
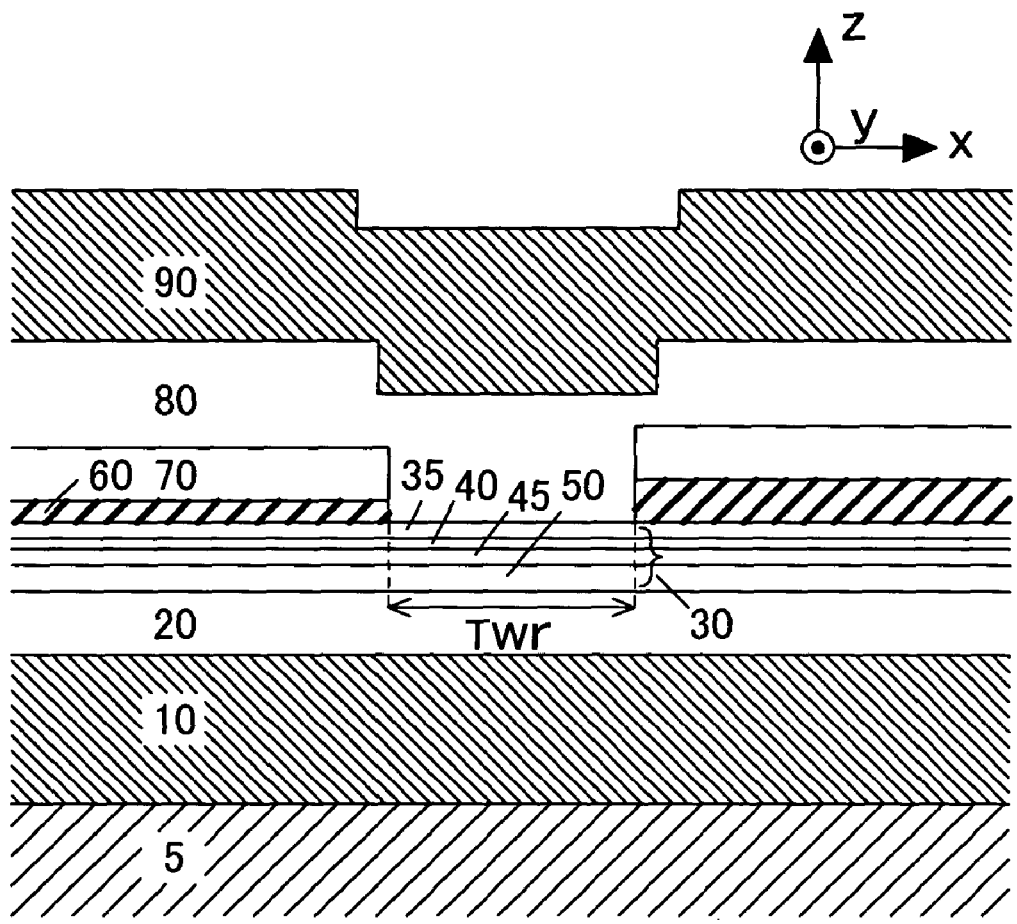
FIG. 5 is a cross-sectional view in a plane parallel to the air bearing surface of the CIP mode giant magnetoresistive head.

It is also possible to closely observe a cross-sectional configuration of the magnetic head as shown in FIG. 5 by using a transmission electron microscopy (TEM). From the drawing, it can be seen that the respective thicknesses of the left and right antiferromagnetic films are different.

By varying the thickness difference $\Delta t$ between the left and right antiferromagnetic films from 0.5 nm to 12 nm, a plurality of magnetic heads were fabricated. In the magnetic head in which the thickness difference $\Delta t$ was smaller than 1 nm, however, the magnetizing directions for the left and right antiferromagnetic film were the same so that magnetizing in desired directions was not performed. In the magnetic head in which $\Delta t$ was larger than 10 nm, however, a short-circuit defect occurred in the antiferromagnetic film with a larger thickness due to insufficient electrostatic durability. By the foregoing results, it was shown that the film thickness difference Δt between the left and right antiferromagnetic films was preferably controlled to be not less than 1 nm and not more than 10 nm.

On the other hand, the magnetizing direction of the magnetic head according to Embodiment 1 was varied to satisfy $0<\theta<90$ on the x-minus side and satisfy $270<\theta<360$ on the x-plus side, so that a plurality of magnetic heads in which the magnetization directions of the free layers in the exchange coupled regions were different were fabricated. Although the present embodiment had controlled the magnetizing directions such that $\theta_2=360-\theta_1$ was satisfied if the magnetizing direction on the x-minus side was designated as $\theta_1$ and the magnetizing direction on the x-plus side was designated as $\theta_2$, the values of $\theta_1$ and $\theta_2$ may also be determined without providing any correlation therebetween so long as they are within the foregoing range.

Comparative Example 1

A conventional-type giant magnetoresistive head was fabricated in the same manner as in Embodiment 1 except that the fabrication process did not include the step of reducing the thickness of one of the antiferromagnetic films. The magnetizing directions for the bias applying films in the conventional-type head were oriented in the direction of track width ($\theta=0$). In the conventional-type giant magnetoresistive head, the track width Twr and the height hMR are the same as in the first embodiment.

A current of 3 mA was caused to flow in each of the heads according to Example 1 and Comparative Example 1 thus fabricated and the respective read outputs and magnetic read widths thereof were compared with each other.

A magnetic read width was defined herein as a width corresponding to 5% to 95% of a value calculated by integrating the sensitivity distribution in the direction of track width of head. The sensitivity distribution in the direction of track width was obtained by measuring read outputs from a giant magnetoresistive head when a medium having a track width not more than ⅒ of the inter-electrode spacing Twr was moved in the direction of track width relative to the head. The medium having the reduced track width was produced by using a recording head with a normal track width to record the track thereof, moving the recording head in the direction of track width, and thereby DC erasing the edges of the recorded track.

Figure 9A:
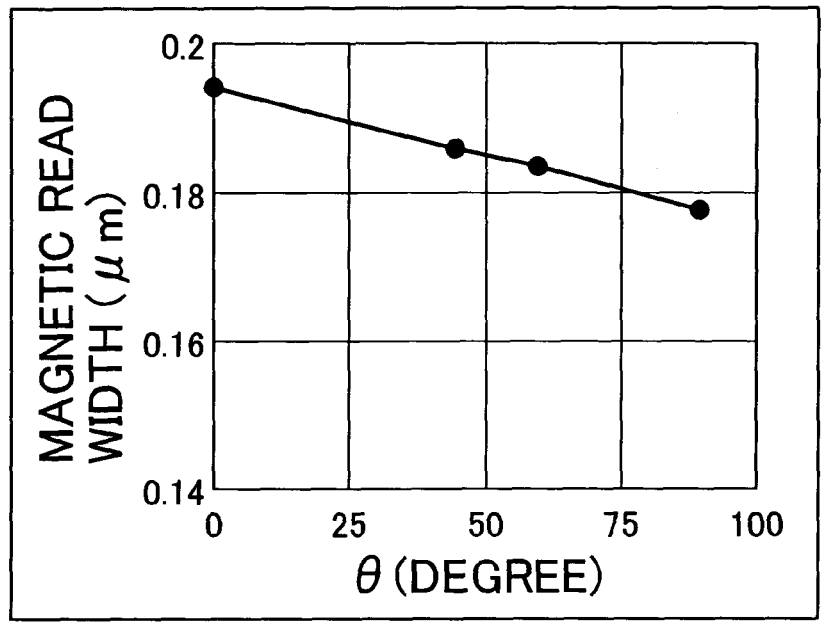
FIGS. 9A and 9B are characteristic views showing a magnetic read width and a read output.
Figure 9B:
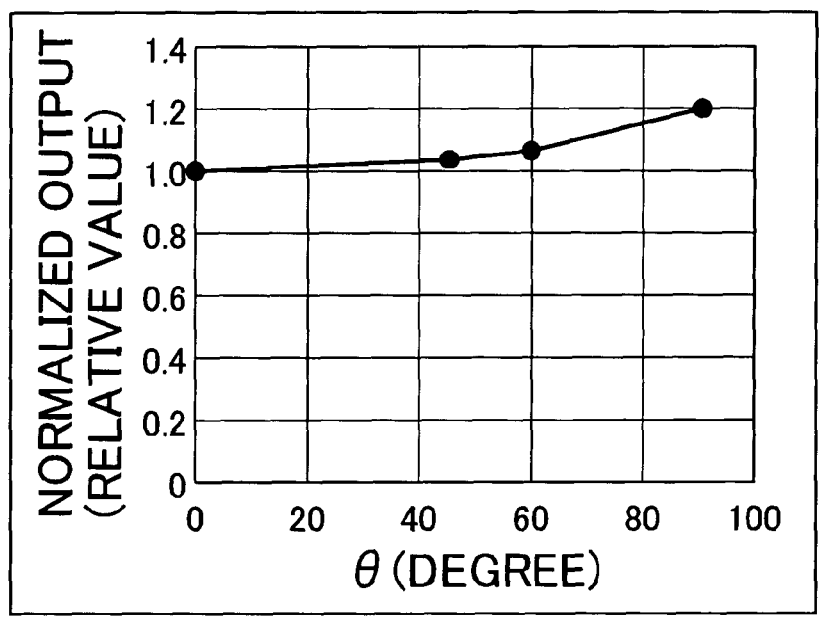

FIGS. 9A and 9B show the result of measurement. By FIGS. 9A and 9B, it was shown that, as $\theta$ was increased, the magnetic track width was smaller and the read output was larger than in the conventional head ($\theta=0$). In particular, the head according to Embodiment 1 in which $\theta$ was 80 had a magnetic track width smaller by about 15 nm than that of the conventional head and a read output higher by about 20% than that of the conventional head.

Figure 10A:
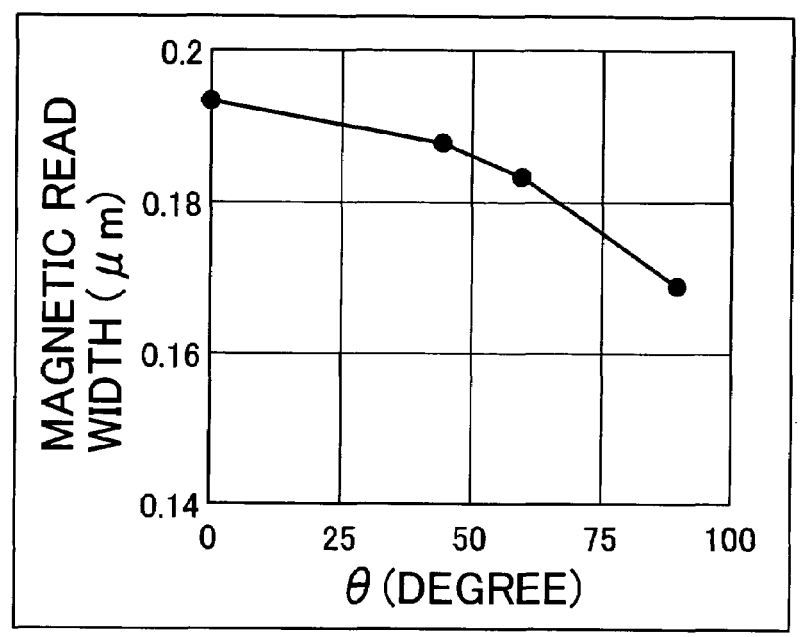
FIGS. 10A and 10B are characteristic views showing the magnetic read width and the read output.
Figure 10B:
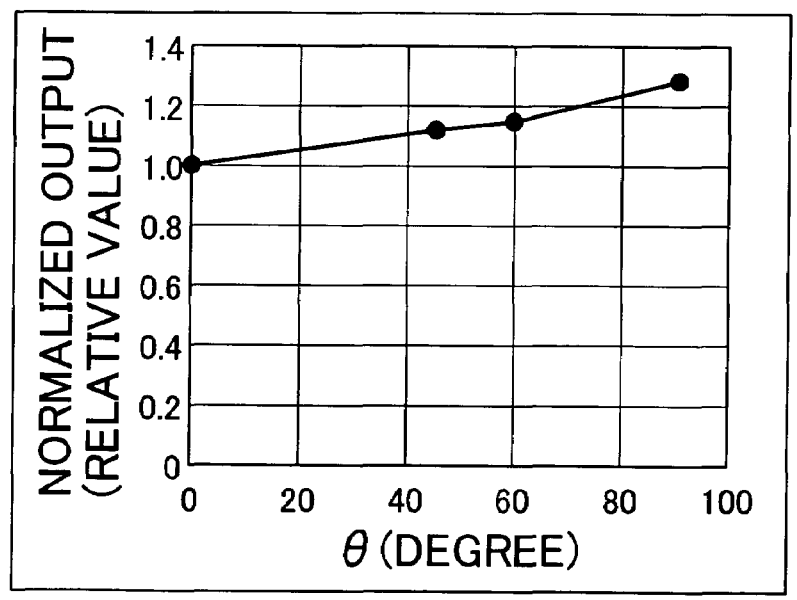

Next, a plurality of giant magnetoresistive heads in each of which the height of the free layer in each of the exchange coupled regions was larger than the height of the free layer in the sensing region were fabricated by using the same process steps as used in the present embodiment, while varying the magnetizing direction for the bias applying films. The height of the free layer in the sensing region was adjusted to 0.1 ìm and the height of the free layer in each of the exchange coupled regions was adjusted to 0.5 ìm. The other conditions were the same as used to fabricate the head shown in FIG. 5. FIGS. 10A and 10B show the result of measuring read outputs and magnetic track widths and comparing them with those of the conventional head ($\theta=0$).

In this case also, it was shown that the magnetic read widths were smaller and the read outputs were larger than in the conventional head. Through a comparison with the result shown in FIGS. 9A and 9B which was obtained under the condition that the height in each of the exchange coupled regions was equal to the height in the sensing region, it was also shown that the effect of reducing the magnetic read width and increasing the read output was enhanced by increasing the height in the exchange coupled region. If $\theta$ is 80, e.g., the magnetic read width was smaller by about 20 nm and the read output was higher by about 25% than in the conventional head.

It was shown by the present inventors that, even when the free layer 35 of the GMR film 30 according to Embodiment 1 was replaced with a specular reflector structure including an oxide layer, a giant magnetoresistive head free from Barkhausen noise and having a high output was obtainable.

Although the antiferromagnetic films composing the bias applying films were composed of MnPt, another material such as MnIr may also be used instead.

Although it is also possible to deposit the antiferromagnetic layer 60, the free layer 35, the non-magnetic layer 40, the pinned layer 45, and the antiferromagnetic layer 50 in this order in forming the GMR film, the GMR film according to the present invention is more easily formed by depositing the foregoing layers in the order shown in the present embodiment.

Embodiment 2

Figure 11:
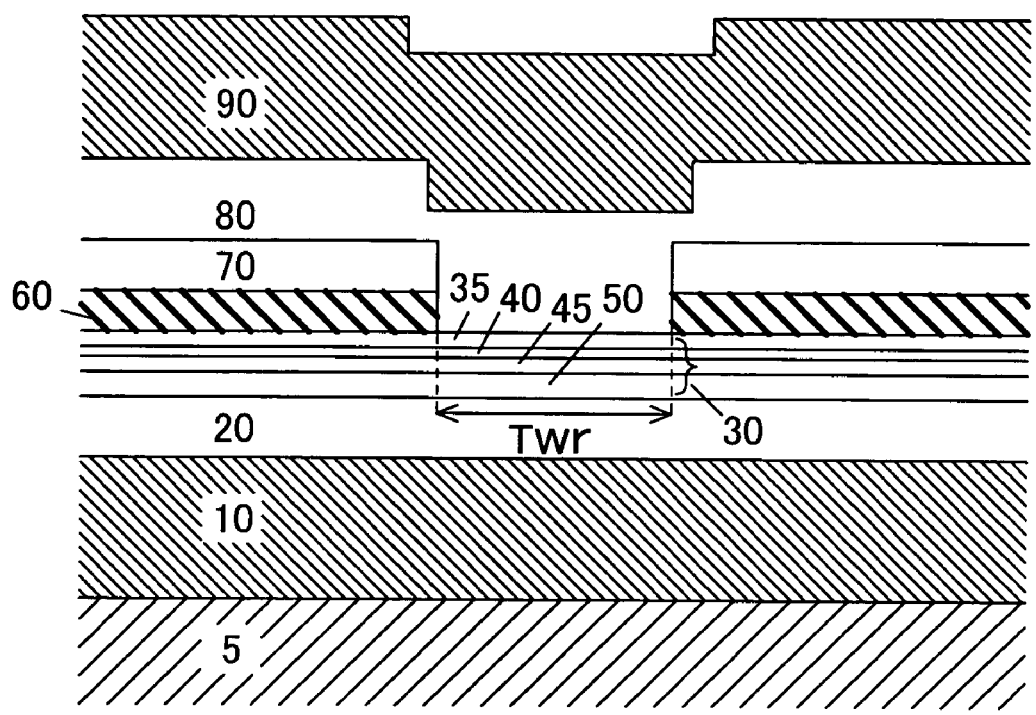
FIG. 11 is a cross-sectional view in a plane parallel to the air bearing surface of the CIP mode giant magnetoresistive head.

As shown in FIG. 11, a magnetic head comprising a CIP mode magnetoresistive element obtained by forming a lower shield film (NiFe film) 10 and an insulating film ($Al_2O_3$ film) 20 for magnetic gap formation on a substrate 5 and then forming a giant magnetoresistive film (GMR film) 30 was fabricated.

In the present embodiment, the magnetoresistive element was formed as follows in accordance with the process shown in FIG. 6B and FIG. 7B.

First, in Step b1, the GMR film 30 composed of an antiferromagnetic layer (MnPt) 50, a pinned layer (Co/Ru/Co multilayer film) 45, a non-magnetic layer (Cu) 40, and a free layer (NiFe/CoFe multilayer film) 35, an antiferromagnetic layer (MnIr) 60, and an electrode film (Nb/Au/Nb) 70 were deposited successively.

Next, in Step b2, an organic resist film 100 was deposited. Then, in Step b3, the electrode film 70 and the antiferromagnetic layer 60 were patterned by ion milling such that the track width Twr was adjusted to 0.1 ìm.

Next, in Step b4, the organic resist film 100 was removed.

Figure 12A:
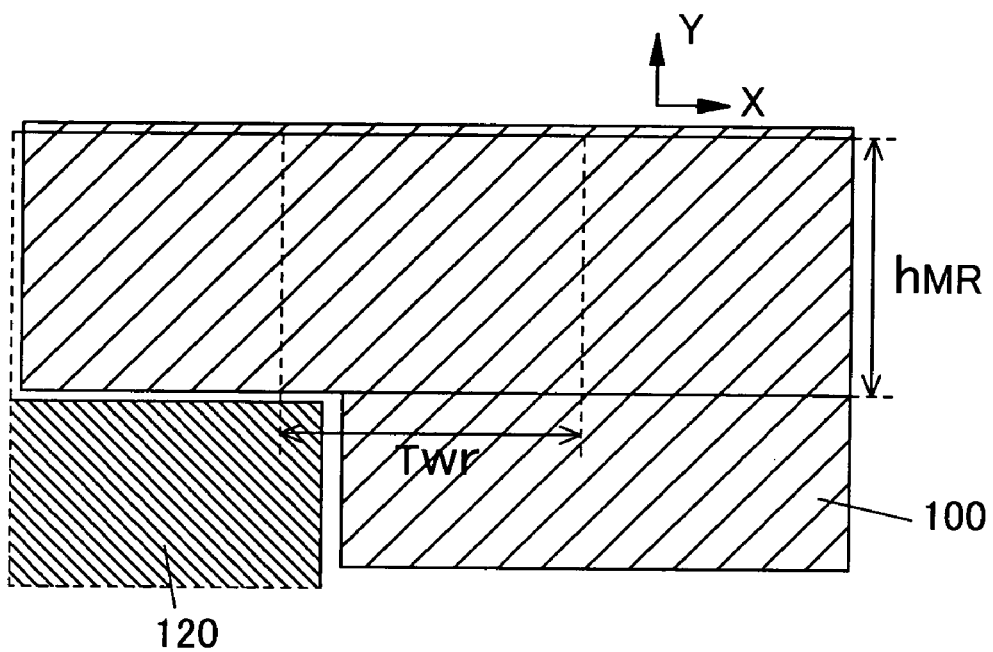
FIGS. 12A and 12B show the respective positions at which an organic resist film and a permanent magnetic film are disposed in a plan configuration of the magnetoresistive element.

In Step b5, an organic resist film 100 was deposited and then a permanent magnetic film (CoCrPt film) 120 for magnetizing one of the bias applying films was formed. FIG. 12A shows respective plan positions at which the organic resist film 100 and the permanent magnetic film 120 are formed in Step b5. The residual magnetic flux density Br of the permanent magneto film was adjusted to 1.1 T and the thickness thereof was adjusted to 100 nm.

In Step b6, the organic resist film 100 was removed. Thereafter, an insulating film ($Al_2O_3$ film) 80 for magnetic gap formation and an upper shield film (NiFe film) 90 were deposited, whereby the magnetic head was fabricated. In the present embodiment, the height hMR was adjusted to 0.1 ìm.

Figure 12B:
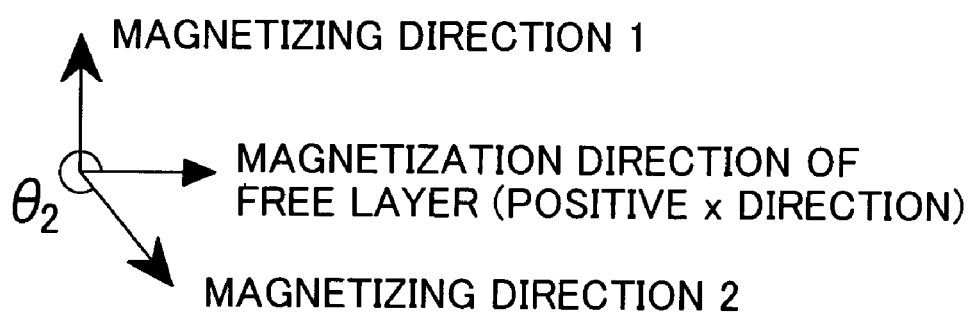

The present embodiment used the permanent magnetic film to magnetize the left and right bias applying films in different directions. If the magnetization direction of the free layer was as shown in FIG. 12B, the permanent magnetic film was magnetized by applying a magnetic field of 10 kOe in the magnetizing direction 1 shown in FIG. 12B. Then, a heat treatment was performed at 270 C for 30 minutes, while applying a magnetic field of 200 kOe in the magnetizing direction 2. The $\theta_2$ in the magnetizing direction 2 was set to 300.

Figure 8B:
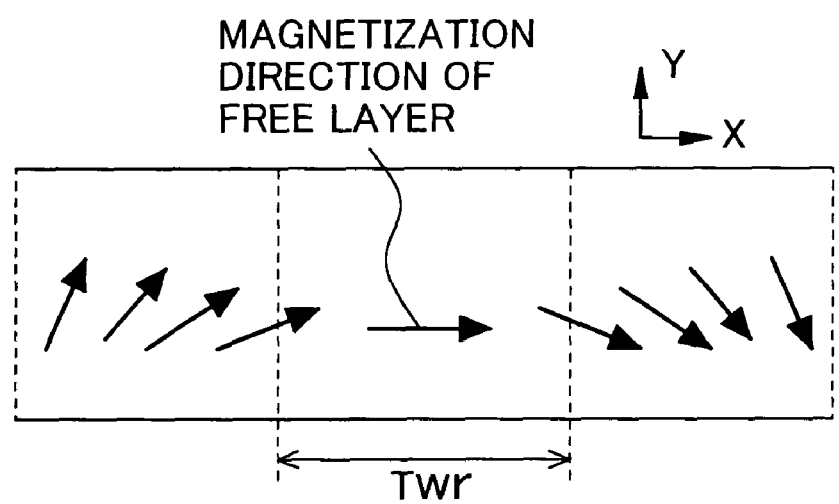

As a result, the bias applying film on the x-plus side was magnetized in the magnetizing direction 2, while an intense magnetic field of about 5 kOe at the maximum was applied from the permanent magnetic film to the bias applying film on the x-minus side, so that the magnetization distribution shown in FIG. 8B was obtained. Although the magnetic field from the permanent magnet is weakened by the shields, a satisfactory magnetizing field is applied also in the direction of height since the distance between the shields overlying and underlying the bias applying film is as large as about 150 nm.

After the bias applying films were magnetized in accordance with the foregoing method, the permanent magnetic film was removed simultaneously with the processing of the air bearing surface of the head.

In the present embodiment also, a read head having a magnetic track width which is smaller by about 20 nm than that of the conventional head and having a read output which is higher by about 25% than that of the conventional head was obtained.

Embodiment 3

Figure 13:
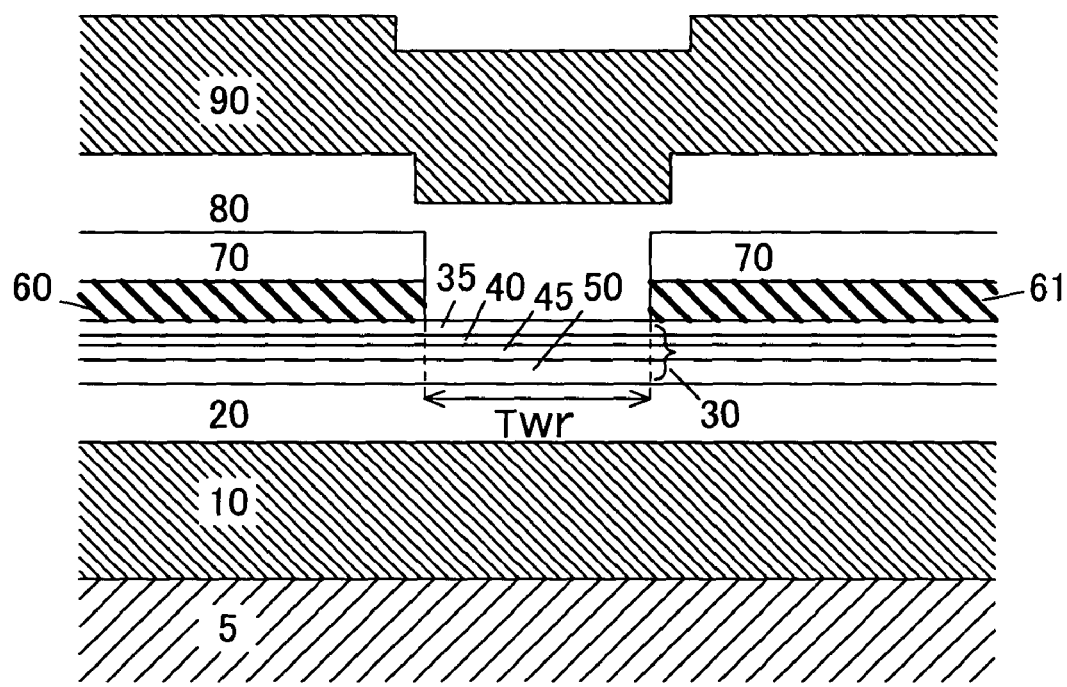
FIG. 13 is a cross-sectional view in a plane parallel to the air bearing surface of the CIP mode giant magnetoresistive head.

As shown in FIG. 13, a magnetic head comprising a CIP mode giant magnetoresistive element obtained by forming a lower shield film (NiFe film) 10 and an insulating film ($Al_2O_3$ film) 20 for magnetic gap formation on a substrate 5 and then forming a giant magnetoresistive film (GMR film) 30 was fabricated.

In the present embodiment, the magnetoresistive element was formed as follows in accordance with the process shown in FIG. 6C and FIG. 7C.

First, in Step c1, a GMR film 30 composed of an antiferromagnetic layer (MnPt) 50, a pinned layer (Co/Ru/Co multilayer film) 45, a non-magnetic layer (Cu) 40, and a free layer (NiFe/CoFe multilayer film) 35, an antiferromagnetic layer (MnPt) 60, and an electrode film (Nb/Au/Nb) 70 were deposited successively. The film thickness of the antiferromagnetic layer 60 was adjusted to 15 nm.

Next, in Step c2, an organic resist film 100 was deposited. Then, in Step c3, the electrode film 70 and the antiferromagnetic layer 60 were patterned by ion milling such that only the respective regions thereof corresponding to one of the bias applying films were left.

Next, in Step c4, the organic resist film 100 was removed.

In Step c5, an organic resist film 100 was deposited over the region corresponding to the inter-electrode spacing and the bias applying film.

In Step c6, the other of the antiferromagnetic films (MnIr) 61 and an electrode film were formed by using the organic resist film 100 as a mask. A newly formed antiferromagnetic layer 61 was composed of a material different from the material composing the existing antiferromagnetic layer 60 and the film thickness of the newly formed antiferromagnetic layer 61 was adjusted to 15 nm.

In Step c7, the organic resist film 100 was removed. Thereafter, an insulating film ($Al_2O_3$ film) 80 for magnetic gap formation and an upper shield film (NiFe film) 90 were deposited so that a magnetic head was fabricated. In the present embodiment, the height hMR was adjusted to 0.1 im.

Since the different materials were used to compose the left and right antiferromagnetic films in the head according to the present embodiment, the magnetizing directions for the bias applying films can be oriented in different directions by performing a plurality of heat treatments under different conditions.

First, a first heat treatment was performed as follows in order to magnetize the bias applying film on the x-minus side composed of a MnPt antiferromagnetic film. If the magnetization direction of the free layer is in the x-plus direction, the heat treatment was performed at 270 C for 30 minutes, while applying a magnetic field of 1 kOe in the magnetizing direction 1 tilted by $\theta_1$ from the x-plus direction, as shown in the plan view of FIG. 8A. As a result, the bias applying film on the x-minus side composed of the MnPt antiferromagnetic film was magnetized in the magnetizing direction 1.

Next, second and third heat treatments were performed as follows in order to magnetize the bias applying film on the x-plus side composed of the MnIr antiferromagnetic film. The second heat treatment was performed at 270 C for 3 hours, while applying a magnetic field of 1 kOe in the magnetizing direction 1 tilted by $\theta_1$ from the x-plus direction shown in FIG. 8A. The third heat treatment was further performed at 250 C for 30 minutes, while applying a magnetic field of 200 Oe in the magnetizing direction 2 tilted by $\theta_2$ from the x-plus direction. As a result, the bias applying film on the x-plus side composed of the MnIr antiferromagnetic film was magnetized in the magnetizing direction 2. In the present embodiment, $\theta_1$ was set to 80 and $\theta_2$ was set to 280.

It was shown by the present inventors that the magnetic head according to Embodiment 3 thus constituted allows a read head with a reduced magnetic track width and with a high read output to be obtained.

By analyzing the components of a magnetoresistive element using EDX (energy dispersive X-ray spectroscopy), it was shown that the left and right antiferromagnetic layers are composed of different materials. The EDX analysis is defined herein as a method for sensing an excited characteristic X-ray by irradiating a surface of a solid with a finely converged electron beam.

Embodiment 4

Figure 14:
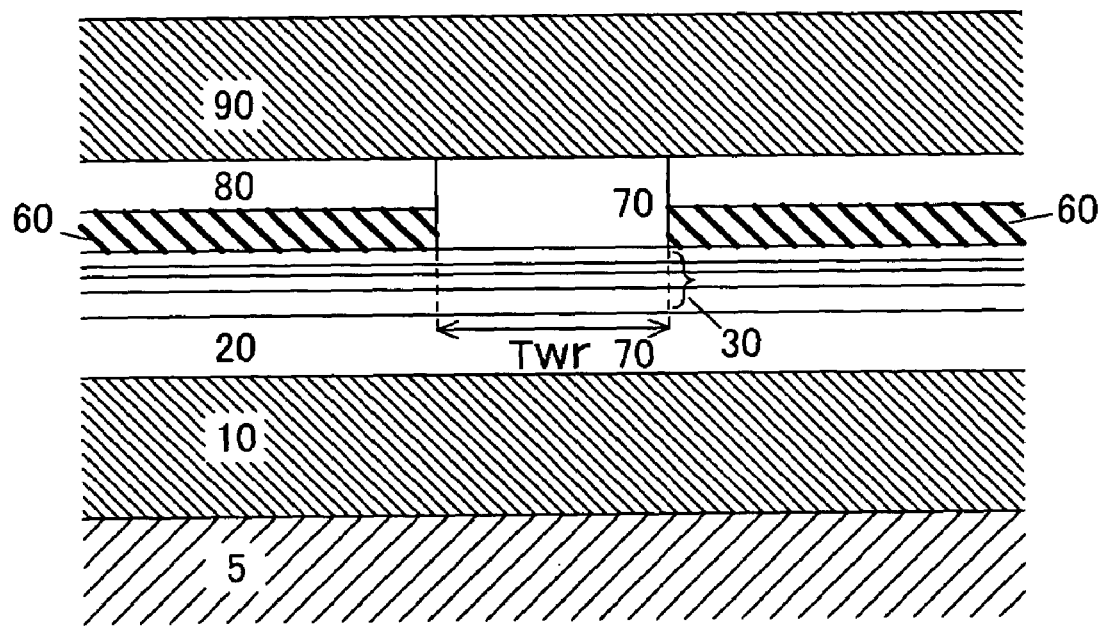
FIG. 14 is a cross-sectional view in a plane parallel to the air bearing surface of the CPP mode giant magnetoresistive head.

As shown in FIG. 14A, a magnetic head comprising a CIP mode giant magnetoresistive element obtained by forming a lower magnetic shield film 10, serving also as a lower electrode film (NiFe film), on a substrate 5, forming a lower electrode film 70 and a magnetic gap layer 20 on the lower magnetic shield film 10, and further forming a giant magnetoresistive film (GMR film) 30 thereon was fabricated.

Figure 6A:
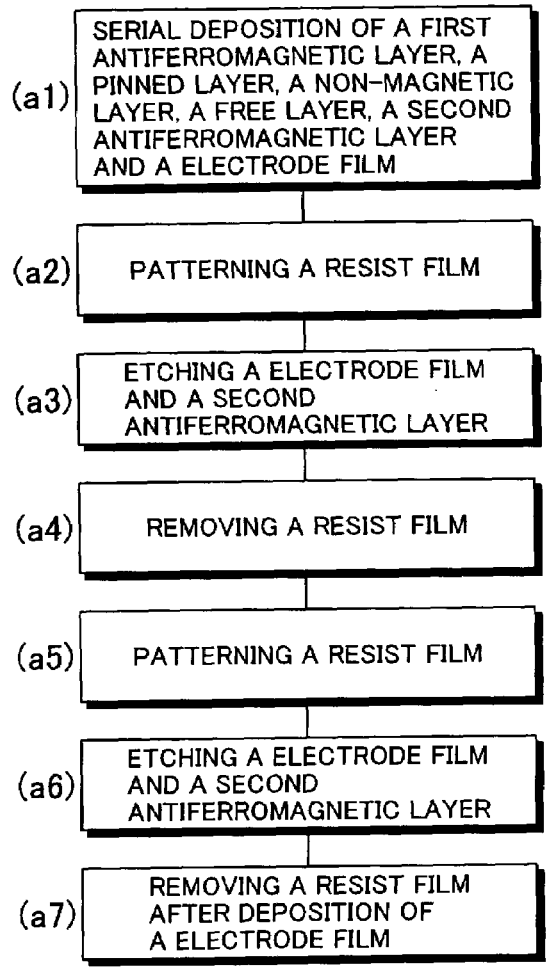
FIGS. 6A to 6C are flow charts each illustrating a fabrication process for the giant magnetoresistive element according to the present invention.
Figure 6B:
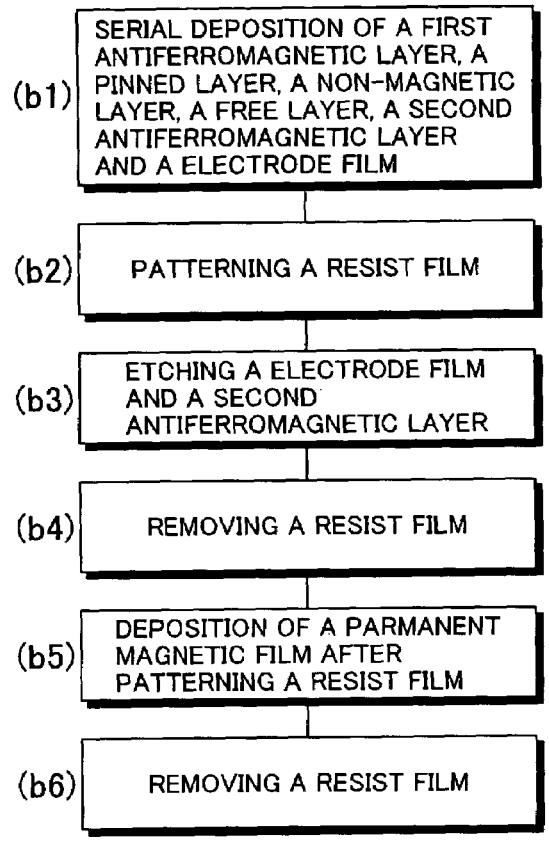
Figure 6C:
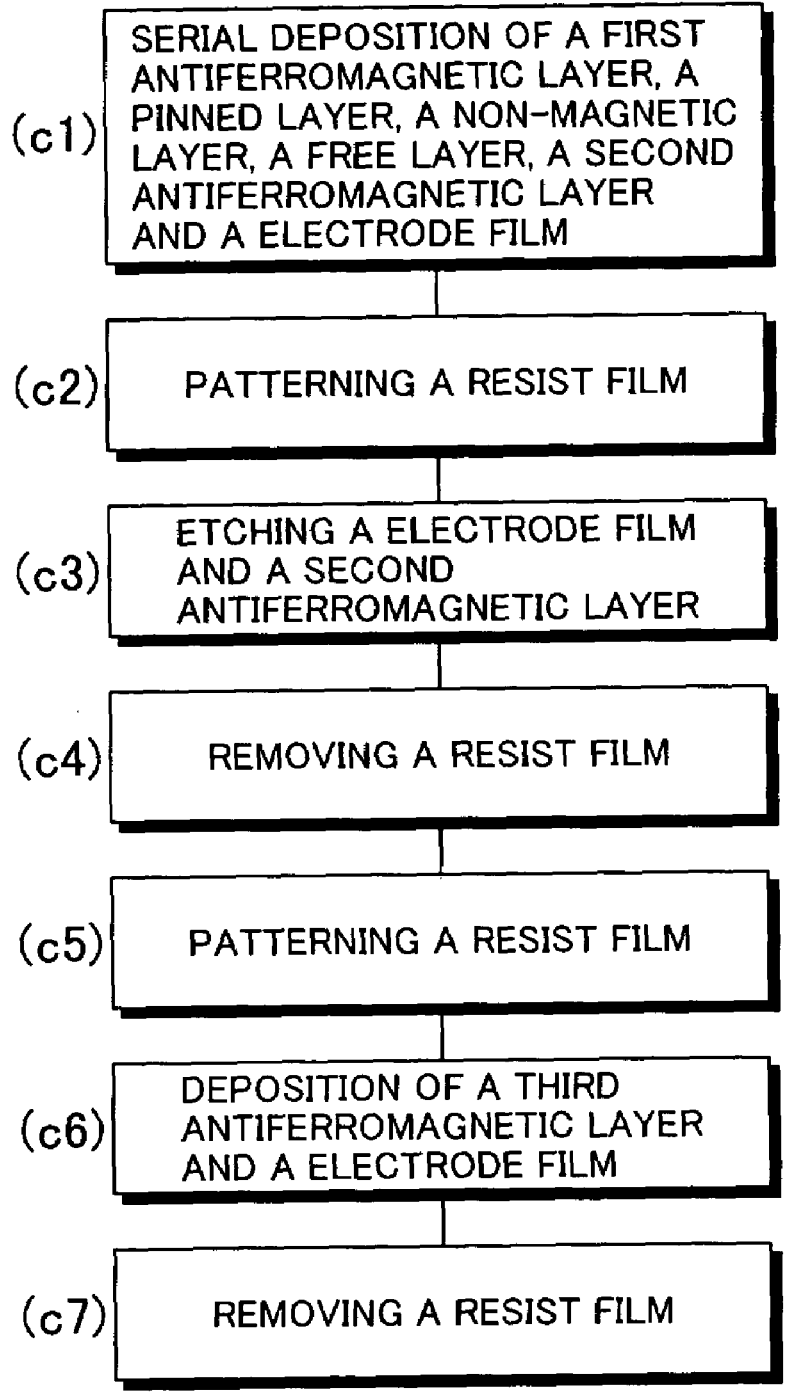
Figure 7B:
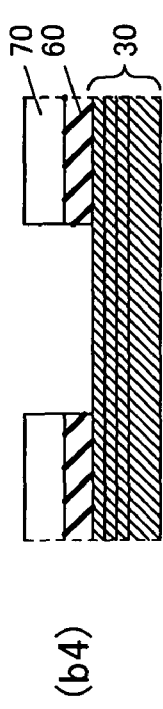
Figure 7B:
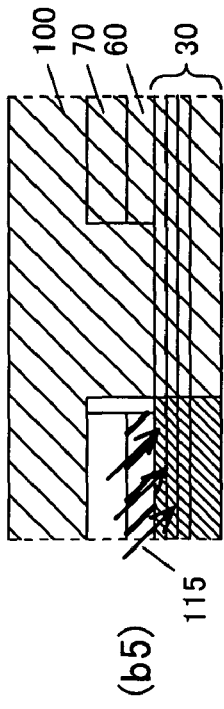
Figure 7B:
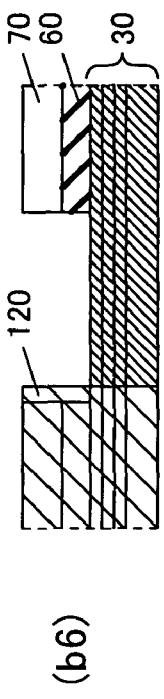
Figure 7B:
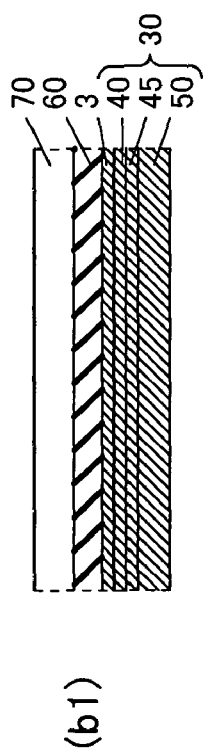
Figure 7B:
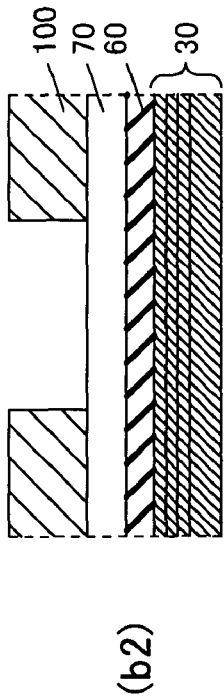
Figure 7B:
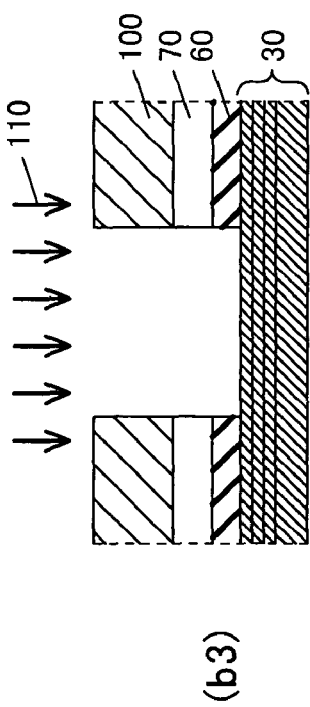

In the present embodiment, the formation of the magnetoresistive element was performed in the same manner as in the process shown in FIGS. 6A to 6C described in Embodiment 1 except that the track width Twr was adjusted to 0.07 im.

By further disposing the upper electrode film 70, the magnetic gap layer 80, and the upper magnetic shield layer 90, serving also as the upper electrode film (NiFe film), on the magnetoresistive element, the magnetic head was fabricated. The height hMR was adjusted to 0.07 im. The magnetizing of the left and right bias applying films different from each other was performed in accordance with the same method as described in Embodiment 1.

It was shown by the present inventors that, though the track width was reduced in the magnetic head of Embodiment 4 thus fabricated compared with the magnetic head according to Embodiment 1, a high read output was achievable by reducing the magnetic track width.

The present invention also allows a magnetic memory device combined with an ultra-high-density recording medium of, e.g., 200 Gbit/in2 to be implemented.

Embodiment 5

Figure 15A:
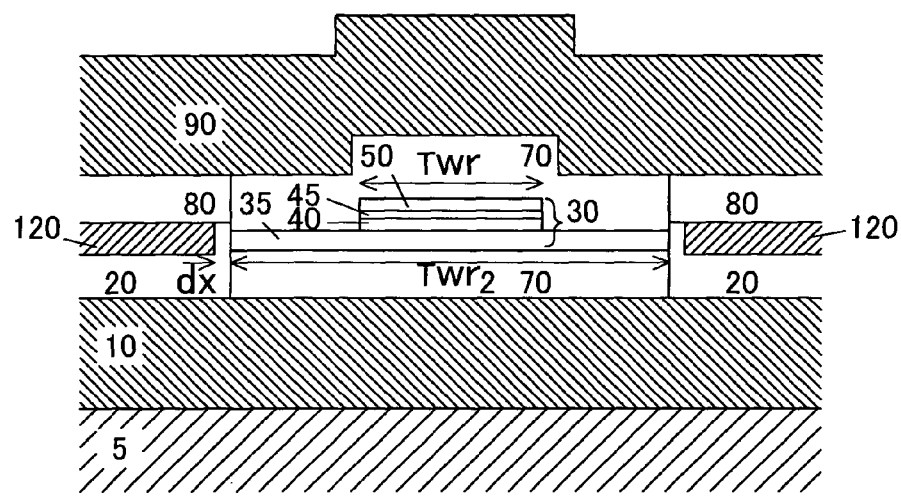
FIGS. 15A and 15B are a cross-sectional view and a plan view in a plane parallel to the air bearing surface of the CPP mode giant magnetoresistive head.
Figure 15B:
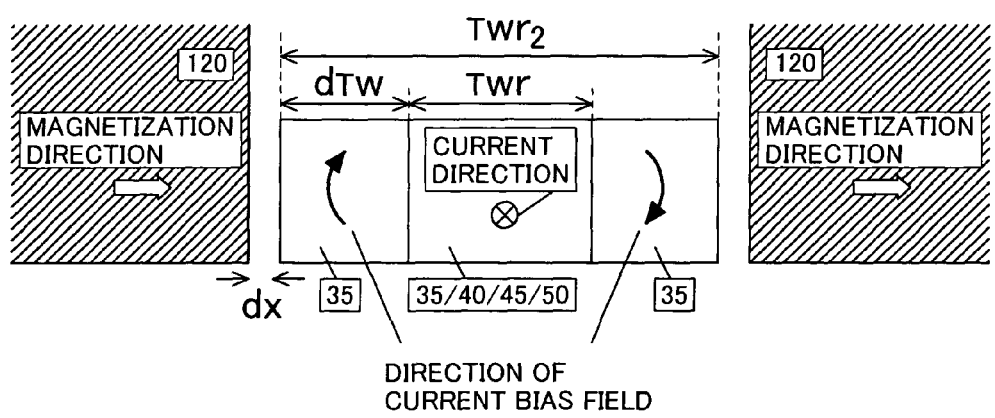
Figure 16:
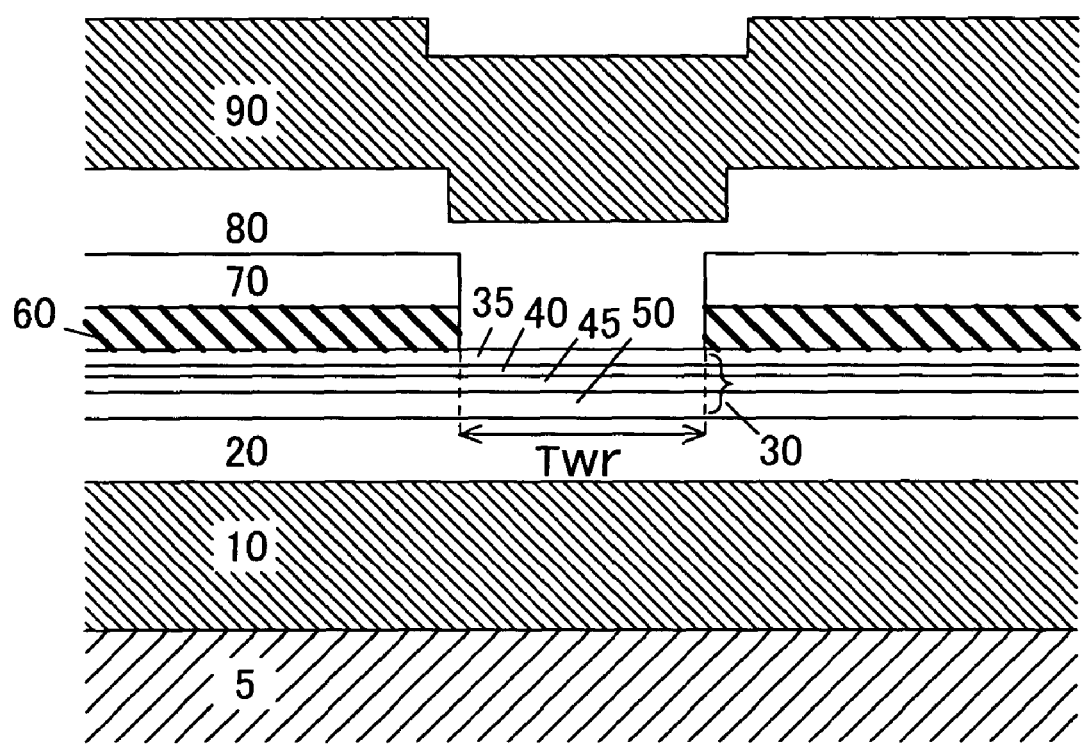
FIG. 16 is a cross-sectional view of a conventional CIP mode giant magnetoresistive head.

As another embodiment according to the present invention, a magnetic head comprising a CPP mode giant magnetoresistive element with a hard bias structure shown in FIGS. 15A and 15B was fabricated.

As shown in FIG. 15A, a lower magnetic shield film 10 serving also as a lower electrode film (NiFe film) was formed first on a substrate 5, followed by a lower electrode film 70 and a magnetoresistive film (GMR film) 30 formed on the lower magnetic shield film 10. An organic resist film formed to have a specified width was disposed on the foregoing multilayer films and ion milling using the organic resist film as a mask was performed to remove the both edge regions so that the track width Twr was obtained. During the ion milling, the free layer 35 was not etched to be left. After the organic resist film was removed, an upper electrode film 70 was deposited and an organic resist film was formed again to have a specified width. By using the organic resist film as a mask, ion milling was performed to remove the both edge regions so that the width $Twr_2$ of the free layer 35 was obtained.

After an insulating film ($Al_2O_3$ film) 20 for magnetic gap formation was then formed, a permanent magnetic film 120 was deposited to serve as a magnetic domain control film. The permanent magnetic film had a residual magnetic flux density Br thereof adjusted to be equal to the saturated magnetic flux density of the free layer 35 and had a thickness thereof adjusted to triple the thickness of the free layer. The distance dx between the free layer and the permanent magnet was adjusted to 5 nm. After an insulating film ($Al_2O_3$ film) 80 for magnetic gap formation was further formed, the organic resist film was removed and an upper shield film (NiFe film) 90 was deposited thereon, whereby the magnetic head was fabricated.

The track width Twr corresponding to the sensing region and the width $Twr_2$ were adjusted to 0.1 im and 0.15 im, respectively, so that the difference dTw between the widths Twr and $Twr_2$ was 0.05 im.

Figure 1B:
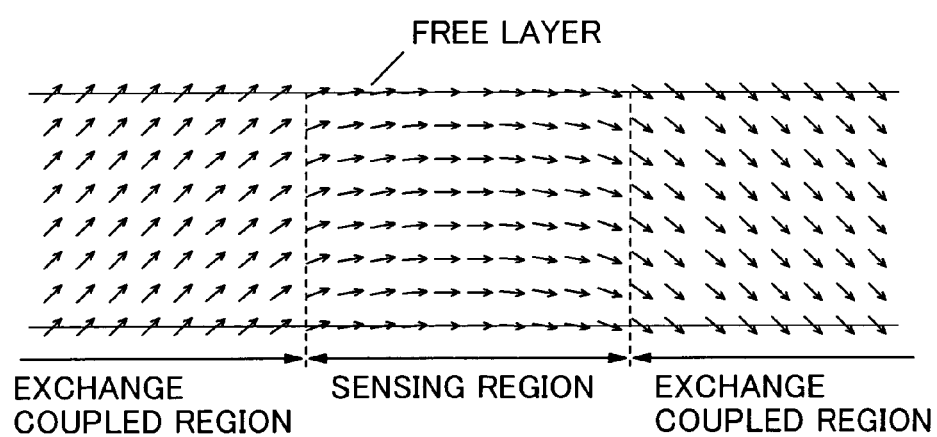

The magnetization and current directions of the permanent magnet 120 were oriented in the directions shown in FIG. 15B. As shown in the drawing, a bias magnetic field induced by a current is applied in an upward direction on the left-hand region of the free layer 35, while it is applied in a downward direction on the right-hand region of the free layer 35. It was shown by simulation that a magnetization distribution in the free layer was the same as that shown in FIG. 1B due to a domain control magnetic field from the permanent magnet and the bias magnetic field induced by the current. At that time, the current value was adjusted to 3 mA.

In the present embodiment also, a read head having a magnetic track width which is smaller by about 20 nm than that of a conventional head with a hard bias structure and a read output which is higher by about 25% than that of the conventional head was obtained.

The same effects were achieved when each of the magnetization and current directions of the permanent magnetic film shown in FIG. 15B was inverted by 180.

Although a magnetoresistive film 30 according to the present embodiment was formed by depositing the free layer 35, a Cu layer 40, a pinned layer 45, and an antiferromagnetic layer 50 in this order, it is also possible to deposit the antiferromagnetic layer 50, the pinned layer 45, and the Cu layer 40 in this order, pattern the resulting multilayer structure, and then deposit the free layer 35.

As a result of fabricating heads by varying the difference value dTw from 10 nm to 100 nm, a magnetic track width was reduced and a read output was increased in each of the heads.

Although the width of the electrode 70 was adjusted to be the same as the width of the free layer 35 in the present embodiment, the same effect was achieved even when the width of the electrode 70 was adjusted to be smaller than the width of the free layer 35.

It was shown by the present inventors that a high read output was achievable by reducing the magnetic track width in the magnetic head of Embodiment 5 thus fabricated, though the magnetic domain control method was different from that used in Embodiment 1.

The present invention also allows a magnetic memory device combined with an ultra-high-density recording medium of, e.g., 200 Gbit/in2 to be implemented.

Embodiment 6

As other embodiments of the present invention, the following magnetic heads were fabricated.

The magnetic head comprises: an upper shield; a lower shield; and a magnetoresistive element disposed between the upper and lower shields, wherein the magnetoresistive element has: a magnetoresistive film having a pinned layer, a non-magnetic layer, and a free layer; a pair of terminals for applying a current to the magnetoresistive film; and bias applying means for applying a bias magnetic field for magnetic domain control to the free layer, the free layer having a sensing region and a pair of out-of-sensing-region regions on both ends of the sensing region, a magnetization direction of one of the out-of-sensing-region regions and a magnetization direction of the other out-of-sensing-region region having different components in a direction of element height, magnetization of the one of the out-of-sensing-region regions and magnetization of the other out-of-sensing-region region being nearly symmetrical relative to the sensing region interposed therebetween.

The magnetic head comprises: an upper shield; a lower shield; and a magnetoresistive element disposed between the upper and lower shields, wherein the magnetoresistive element has: a magnetoresistive film having a pinned layer, a non-magnetic layer, and a free layer; a pair of terminals for applying a current to the magnetoresistive film; and bias applying means for applying a bias magnetic field for magnetic domain control to the free layer, the magnetoresistive element further having, if a direction of track width is designated by an x-axis, a direction of element height orthogonal to the direction of track width is designated by a y-axis, a magnetization direction of the free layer is designated as an x-plus direction, and a direction opposite to an air bearing surface is designated as a y-plus direction: means for generating a bias magnetic field having a component in the y-plus direction in a region of the free layer located on an x-minus side and generating a bias magnetic field having a component in a y-minus direction in a region of the free layer located on the x-plus side.

The magnetic head described above, wherein, if the magnetization direction of the free layer in the coordinate system is designated as (sin θ, cos θ) and a plus direction of the x-axis is designated as (0, 1), the magnetization direction in the region of the free layer located on the x-minus side to which the bias magnetic field having the component in the y-plus direction has been applied satisfies 0<θ<90 and the magnetization direction in the region of the free layer located on the x-plus side to which the bias magnetic field having the component in the y-minus direction has been applied satisfies 270<θ<360.

The magnetic head described above, wherein the pinned layer has a magnetization direction fixed by a first antiferromagnetic layer.

The magnetic head described above, wherein the bias applying means for applying a bias magnetic field for magnetic domain control to the free layer is disposed on each of both edges in the direction of track width of the magnetoresistive film and is composed of a second antiferromagnetic layer or a permanent magnetic layer exchange coupled to the free layer.

The magnetic head described above, wherein, if a length in a direction of the y-axis of the magnetoresistive element is designated as an element height, a height of each of the bias applying means and the free layer exchange coupled to the bias applying means is equal to or larger than a height of the free layer in a region sandwiched between the bias applying means.

The magnetic head described above, wherein a film thickness difference Δt between the left and right second antiferromagnetic layers of the bias applying means satisfies 1 nm≦Δt≦10 nm.

The magnetic head described above, wherein the left and right second antiferromagnetic layers of the bias applying means are composed of different materials.

The magnetic head described above, wherein the pair of terminals for applying a current are deposited in a direction of thickness of the magnetoresistive film either indirectly with a metal film interposed therebetween or directly without a metal film interposed therebetween such that a current flows in the direction of the thickness of the magnetoresistive film and that the bias magnetic field is generated with the current.

The magnetic head described above, wherein a length of a sensing region is adjusted to be equal to a length in the direction of track width of the pinned layer by adjusting the length of the pinned layer to be smaller than a length in the direction of track width of the free layer and a length in the direction of track width of each of the pair of terminals for applying a current is adjusted to be larger than the length in the direction of track width of the pinned layer.

It was shown by the present inventors that, in each of the magnetic heads described above in the present embodiment, side reading was reduced and a high read output was achieved.

Embodiment 7

As other embodiments of the present invention, the following magnetic recording/reading apparatus were fabricated.

A magnetic recording/reading apparatus comprises: a magnetic recording medium; a magnetic head having an upper shield, a lower shield, and a magnetoresistive element disposed between the upper and lower shields; a magnetic head actuator for actuating the magnetic head; a recording medium actuator for actuating the magnetic recording medium; and a read signal processing system for processing a signal on the magnetoresistive recording medium that has been read by the magnetic head, wherein the magnetoresistive element has: a magnetoresistive film having a pinned layer, a non-magnetic layer, and a free layer; a pair of terminals for applying a current to the magnetoresistive film; and bias applying means for applying a bias magnetic field for out-of-sensing region regions to the free layer, the free layer having a sensing region and a pair of out-of-sensing-region regions on both ends of the sensing region, a magnetization direction of one of the out-of-sensing-region regions and a magnetization direction of the other out-of-sensing-region region having different components in a direction of element height, magnetization of the one of the out-of-sensing-region regions and magnetization of the other out-of-sensing-region region being nearly symmetrical relative to the sensing region interposed therebetween.

A magnetic recording/reading apparatus comprises: a magnetic recording medium; a magnetic head having an upper shield, a lower shield, and a magnetoresistive element disposed between the upper and lower shields; a magnetic head actuator for actuating the magnetic head; a recording medium actuator for actuating the magnetic recording medium; and a read signal processing system for processing a signal on the magnetoresistive recording medium that has been read by the magnetic head, wherein the magnetoresistive element has: a magnetoresistive film having a pinned layer, a non-magnetic layer, and a free layer; a pair of terminals for applying a current to the magnetoresistive film; and bias applying means for applying a bias magnetic field for magnetic domain control to the free layer, the magnetoresistive element further having, if a direction of track width is designated by an x-axis, a direction of element height orthogonal to the direction of track width is designated by a y-axis, a magnetization direction of the free layer is designated as an x-plus direction, and a direction opposite to an air bearing surface is designated as a y-plus direction: means for generating a bias magnetic field having a component in the y-plus direction in a region of the free layer located on an x-minus side and generating a bias magnetic field having a component in a y-minus direction in a region of the free layer located on the x-plus side.

The magnetic recording/reading apparatus described above, wherein, if the magnetization direction of the free layer in the coordinate system is designated as (sin θ, cos θ) and a plus direction of the x-axis is designated as (0, 1), the magnetization direction in the region of the free layer located on the x-minus side to which the bias magnetic field having the component in the y-plus direction has been applied satisfies 0<θ<90 and the magnetization direction in the region of the free layer located on the x-plus side to which the bias magnetic field having the component in the y-minus direction has been applied satisfies 270<θ<360.

The magnetic recording/reading apparatus described above, wherein the pinned layer has a magnetization direction fixed by a first antiferromagnetic layer.

The magnetic recording/reading apparatus described above, wherein the bias applying means for applying a bias magnetic field for magnetic domain control to the free layer is disposed on each of both edges in the direction of track width of the magnetoresistive film and is composed of a second antiferromagnetic layer or a permanent magnetic layer exchange coupled to the free layer.

The magnetic recording/reading apparatus described above, wherein the pair of terminals for applying a current are deposited in a direction of thickness of the magnetoresistive film either indirectly with a metal film interposed therebetween or directly without a metal film interposed therebetween such that a current flows in the direction of the thickness of the magnetoresistive film and that the bias magnetic field is generated with the current.

It was shown by the present inventors that, since each of the foregoing magnetic recording/reading apparatus described above in the present embodiment comprised a magnetic head having a magnetoresistive element according to the present invention, side reading was reduced and a high read output was achieved even in combination with a magnetic recording medium having an extremely high recording density, i.e., a reduced track width.

Embodiment 8

It was shown by the present inventors that a magnetic head (magnetoresistive head) according to the present invention could be fabricated in accordance with the following methods for fabricating the magnetoresistive heads.

The method for fabricating a magnetoresistive head, the method comprising the steps of: forming a first antiferromagnetic layer, a pinned layer, a non-magnetic layer, a free layer, a second antiferromagnetic layer on the free layer, and a resist pattern; milling the second antiferromagnetic layer by using the resist pattern as a mask; forming a second resist pattern; forming a permanent magnetic film for magnetizing the second antiferromagnetic layer by using the second resist pattern as a mask; removing the resist pattern; and removing the permanent magnetic film after magnetizing the antiferromagnetic layer.

The method for fabricating a magnetoresistive head, the method comprising the steps of: forming a first antiferromagnetic layer, a pinned layer, a non-magnetic layer, a free layer, a second antiferromagnetic layer on the free layer, and a resist pattern; milling the second antiferromagnetic layer by using the resist pattern as a mask; removing the resist pattern; forming a second resist pattern; milling the second antiferromagnetic layer by using the second resist pattern as a mask; and removing the resist pattern.

The method for fabricating a magnetoresistive head, the method comprising the steps of: forming a first antiferromagnetic layer, a pinned layer, a non-magnetic layer, a free layer, a second antiferromagnetic layer on the free layer, and a resist pattern; milling the second antiferromagnetic layer by using the resist pattern as a mask; forming again an antiferromagnetic layer; and removing the resist pattern.

As described above, the present invention provides a magnetoresistive element with high read sensitivity and with reduced side reading even if the track width thereof has been reduced, a magnetoresistive head comprising the magnetoresistive element, and a magnetic recording/reading apparatus comprising the magnetoresistive element.

What is claimed is:

1. A magnetoresistive element comprising:
  a magnetoresistive film having a pinned layer, a non-magnetic layer, and a free layer;
  a pair of terminals for applying a current to said magnetoresistive film; and
  bias applying means for applying a bias magnetic field for magnetic domain control to said free layer,
  said free layer having a sensing region and a pair of out-of-sensing-region regions on both ends of said sensing region, a magnetization direction of one of the out-of-sensing-region regions and a magnetization direction of the other out-of-sensing-region region having different components in a direction of element height, magnetization of the one of the out-of-sensing-region regions and magnetization of the other out-of-sensing-region region being nearly symmetrical relative to the sensing region interposed therebetween.

2. A magnetoresistive element comprising:
  a magnetoresistive film having a pinned layer, a non-magnetic layer, and a free layer;
  a pair of terminals for applying a current to said magnetoresistive film; and
  bias applying means for applying a bias magnetic field for magnetic domain control to said free layer, the magnetoresistive element further comprising, if a direction of track width is designated by an x-axis, a direction of element height orthogonal to the direction of track width is designated by a y-axis, a magnetization direction of the free layer is designated as an x-plus direction, and a direction opposite to an air bearing surface is designated as a y-plus direction:
  means for generating a bias magnetic field having a component in the y-plus direction in a region of said free layer located on an x-minus side and generating a bias magnetic field having a component in a y-minus direction in a region of said free layer located on the x-plus side.

3. The magnetoresistive element of claim 2, wherein, if the magnetization direction of said free layer in said coordinate system is designated as (sin θ, cos θ) and a plus direction of the x-axis is designated as (0, 1), the magnetization direction in the region of the free layer located on the x-minus side to which the bias magnetic field having the component in the y-plus direction has been applied satisfies 0<θ<90 and the magnetization direction in the region of the free layer located on the x-plus side to which the bias magnetic field having the component in the y-minus direction has been applied satisfies 270<θ<360.

4. The magnetoresistive element of claim 2, wherein said pinned layer has a magnetization direction fixed by a first antiferromagnetic layer.

5. The magnetoresistive element of claim 2, wherein said bias applying means for applying a bias magnetic field for magnetic domain control to said free layer is disposed on each of both edges in the direction of track width of said magnetoresistive film and is composed of a second antiferromagnetic layer or a permanent magnetic layer exchange coupled to said free layer.

6. The magnetoresistive element of claim 5, wherein, if a length in a direction of the y-axis of said magnetoresistive element is designated as an element height, a height of each of said bias applying means and the free layer exchange coupled to the bias applying means is equal to or larger than a height of the free layer in a region sandwiched between the bias applying means.

7. The magnetoresistive element of claim 5, wherein a film thickness difference Δt between the left and right second antiferromagnetic layers of said bias applying means satisfies 1 nm≦Δt≦10 nm.

8. The magnetoresistive element of claim 5, wherein the left and right second antiferromagnetic layers of said bias applying means are composed of different materials.

9. The magnetoresistive element of claim 2, wherein said pair of terminals for applying a current are deposited in a direction of thickness of the magnetoresistive film either indirectly with a metal film interposed therebetween or directly without a metal film interposed therebetween such that a current flows in the direction of the thickness of said magnetoresistive film and that the bias magnetic field is generated with said current.

10. The magnetoresistive element of claim 9, wherein a length of a sensing region is adjusted to be equal to a length in the direction of track width of said pinned layer by adjusting the length of said pinned layer to be smaller than a length in the direction of track width of said free layer and a length in the direction of track width of each of said pair of terminals for applying a current is adjusted to be larger than the length in the direction of track width of said pinned layer.

* * * * *